(12) United States Patent
Hunzinger et al.

(10) Patent No.: US 9,053,428 B2
(45) Date of Patent: Jun. 9, 2015

(54) METHOD AND APPARATUS OF ROBUST NEURAL TEMPORAL CODING, LEARNING AND CELL RECRUITMENTS FOR MEMORY USING OSCILLATION

(75) Inventors: Jason Frank Hunzinger, Escondido, CA (US); Victor Hokkiu Chan, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 346 days.

(21) Appl. No.: 13/187,915

(22) Filed: Jul. 21, 2011

(65) Prior Publication Data
US 2013/0024409 A1    Jan. 24, 2013

(51) Int. Cl.
*G06N 3/08* (2006.01)
*G06N 3/04* (2006.01)

(52) U.S. Cl.
CPC ..................................... *G06N 3/049* (2013.01)

(58) Field of Classification Search
CPC ...................................................... G06N 3/049
USPC ............................................................ 706/25
See application file for complete search history.

(56) References Cited

U.S. PATENT DOCUMENTS

| | | | |
|---|---|---|---|
| 5,459,817 A | 10/1995 | Shima | |
| 5,666,079 A | 9/1997 | Ma | |
| 6,505,182 B1 | 1/2003 | Van den Heuvel | |
| 6,581,046 B1 | 6/2003 | Ahissar | |
| 7,174,325 B1 | 2/2007 | Ascoli | |
| 7,287,014 B2 | 10/2007 | Chen et al. | |
| 7,412,428 B2 | 8/2008 | Nugent | |
| 7,430,546 B1 | 9/2008 | Suri | |
| 7,512,271 B2 | 3/2009 | Matsugu et al. | |
| 7,904,398 B1 | 3/2011 | Repici | |
| 8,433,665 B2 | 4/2013 | Tang et al. | |
| 8,606,732 B2 | 12/2013 | Venkatraman et al. | |
| 8,625,337 B2 | 1/2014 | Wu et al. | |
| 8,694,452 B2 | 4/2014 | Aparin et al. | |

(Continued)

FOREIGN PATENT DOCUMENTS

| | | |
|---|---|---|
| JP | 7084978 A | 3/1995 |
| TW | 242981 | 3/1995 |

(Continued)

OTHER PUBLICATIONS

B. Ruf et al, "Hebbian learning in networks of spiking neurons using temporal coding", in Biological and artifical computation: From neuroscience to technology, pp. 380-389, 1997.

(Continued)

*Primary Examiner* — Alan Chen
(74) *Attorney, Agent, or Firm* — Rupit M. Patel

(57) ABSTRACT

Certain aspects of the present disclosure support a technique for robust neural temporal coding, learning and cell recruitments for memory using oscillations. Methods are proposed for distinguishing temporal patterns and, in contrast to other "temporal pattern" methods, not merely coincidence of inputs or order of inputs. Moreover, the present disclosure propose practical methods that are biologically-inspired/consistent but reduced in complexity and capable of coding, decoding, recognizing, and learning temporal spike signal patterns. In this disclosure, extensions are proposed to a scalable temporal neural model for robustness, confidence or integrity coding, and recruitment of cells for efficient temporal pattern memory.

56 Claims, 12 Drawing Sheets

(56) References Cited

U.S. PATENT DOCUMENTS

| | | | |
|---|---|---|---|
| 8,706,662 | B2 | 4/2014 | Chan et al. |
| 8,756,173 | B2 | 6/2014 | Hunzinger et al. |
| 2004/0097562 | A1 | 5/2004 | Olesen et al. |
| 2006/0235477 | A1 | 10/2006 | Rom |
| 2008/0208783 | A1 | 8/2008 | Jaros et al. |
| 2009/0287624 | A1 | 11/2009 | Rouat et al. |
| 2009/0313195 | A1 | 12/2009 | McDaid et al. |
| 2010/0076916 | A1 | 3/2010 | Van Der Made |
| 2010/0145402 | A1 | 6/2010 | Rom |
| 2010/0185250 | A1 | 7/2010 | Rom |
| 2010/0220523 | A1 | 9/2010 | Modha et al. |
| 2010/0235310 | A1 | 9/2010 | Gage et al. |
| 2010/0299296 | A1 | 11/2010 | Modha et al. |
| 2010/0299297 | A1 | 11/2010 | Breitwisch et al. |
| 2011/0137843 | A1 | 6/2011 | Poon et al. |
| 2011/0153533 | A1 | 6/2011 | Jackson et al. |
| 2012/0011089 | A1 | 1/2012 | Aparin et al. |
| 2012/0084241 | A1 | 4/2012 | Friedman et al. |
| 2012/0109864 | A1 | 5/2012 | Modha |
| 2012/0150781 | A1 | 6/2012 | Arthur et al. |
| 2013/0046716 | A1 | 2/2013 | Chan et al. |
| 2013/0073491 | A1 | 3/2013 | Izhikevich et al. |
| 2013/0073501 | A1 | 3/2013 | Hunzinger et al. |
| 2013/0103626 | A1 | 4/2013 | Hunzinger |
| 2013/0226851 | A1 | 8/2013 | Hunzinger et al. |
| 2013/0339280 | A1 | 12/2013 | Hunzinger et al. |

FOREIGN PATENT DOCUMENTS

| | | |
|---|---|---|
| WO | 9318474 A1 | 9/1993 |
| WO | 9729437 A1 | 8/1997 |

OTHER PUBLICATIONS

T. Natschlager et al, "Spatial and temporal pattern analysis via spiking neurons", in Institute for Theoretical Computer Science, Technische Universitat Gratz, Austria, pp. 9(3): 319-32, 1998.

W. Maass et al, "On the complexity of learning for spiking neurons with temporal coding", 1999.

Amemori, K.I., et al., "Self-organization of delay lines by spike-time-dependent learning", Neurocomputing, Elsevier Science Publishers, Amsterdam, NL, vol. 61, Oct. 1, 2004, pp. 291-316, XP004568343, ISSN: 0925-2312, DOI: 10.1016/J.Neucom.2003.09.013 p. 29-p. 315.

Arena, P., et al., "STDP with adaptive synaptic delay for robot navigation control", Proceedings of SPIE, vol.6592, May 18, 2007, XP055049378, ISSN: 0277-786X, DOI: 10.1117/12.724204 pp. 65920J-1-pp.65920J-9, paragraph 3.

Babadi, B., et al., "Intrinsic Stability of Temporally Shifted Spike-Timing Dependent Plasticity", PLOS Computational Biology, vol. 6, No. 11, Jan. 1, 2010, pp. el000961-e1000961, XP55040430, ISSN: 1553-734X, DOI: 10.1371/journal.pcbi.1000961 p. 1-p. 13, right-hand column, paragraph 4.

Bako L., et al., "Hardware Implementation of Delay-Coded Spiking-RBF Neural Network for Unsupervised Clustering," in 11th International Conference on Optimization of Electrical and Electronic Equipment (OPTIM), 2008, pp. 51-56.

Bofill-I-Petit, A., et al., "Synchrony Detection and Amplification by Silicon Neurons With STDP Synapses", IEEE Transactions on Neural Networks, Service Center, Piscataway, NJ, US, vol. 15, No. 5, Sep. 1, 2004, pp. 1296-1304, XP011118617, ISSN: 1045-9227, DOI: 10.1109/TNN.2004.832842 p. 1296-p. 1303, right-hand column, paragraph 2.

Bohte S.M., et al., "Unsupervised Clustering with Spiking Neurons by Sparse Temporal Coding and Multilayer RBF Networks," in IEEE Transactions on Neural Networks, 2002, vol. 13(2). pp. 426-435.

Bothe, S.M., et al., "Reducing Spike Train Variability: A Computational Theory of Spike-Timing Dependent Plasticity", Advances in Neural Information Processing Systems (NIPS) 17, Jan. 1, 2005, pp. 201-208, XP055052246, Cambridge, MA [retrieved on Feb. 4, 2013].

Cameron, K., et al., "Spike Timing Dependent Adaptation for Mismatch Compensation", 2006 IEEE International Symposium on Circuits and Systems May 21-24, 2006 Island of Kos, Greece IEEE—Piscataway, NJ,USA,May 21, 2006, XP010938590, DOI: 10.1109/ISCAS.2006.1692812 ISBN: 978-0-7803-9389-9, pp. 1223-1226.

Caporale, N., et al., "Spike Timing-Dependent Plasticity: A Hebbian Learning Rule", Annual Review of Neuroscience, vol. 31, No. 1, Jul. 1, 2008, pp. 25-46, XP055052234, ISSN: 0147-006X, DOI: 10.1146/annurev.neuro.31.06G407.125639 abstract; figure 1 p. 31, left-hand column, paragraph 2—p. 36, left-hand column, paragraph 1.

Clopath, et al.,. "Predicting Neuronal Activity with Simple Models of the Threshold Type: Adaptive Exponential Integrate-and-Fire Model with Two Compartments," Preprint submitted to Elsevier Science, Aug. 29, 2006, 6 pgs.

Dan et al., Spike timing-dependent review plasticity of neural circuits, Neuron, Sep. 2004, pp. 23-30, vol. 44.

Duro, et al., "Discrete-Time Backpropagation for Training Synaptic Delay-Based Artificial Neural Networks," IEEE Transactions on Neural Networks, vol. 10, No. 4, Jul. 1999, pp. 779-789.

Froemke, et al. "Spike-timing-dependent synaptic modification induced by natural spike trains," Division of Neurobiology, Department of Molecular and Cell Biology, UC Berkeley, Nature, letters to nature, vol. 416, Mar. 2002, 6 pgs.

Froemke, et al.,. "Temporal modulation of spike-timing-dependent plasticity," Frontiers in Synaptic Neuroscience, vol. 2, Article 19, Jun. 2010, 16 pgs.

Gilson, M., et al., "Stability versus Neuronal Specialization for STDP: Long-Tail Weight Distributions Solve the Dilemma", PLOS One, vol. 6, No. 10, Jan. 1, 2011, p. e25339, XP055052242, ISSN: 1932-6203, DOI: 10.1371/journal.pone.0025339.

Huerta, et al., "Bidirectional Synaptic Plasticity Induced by a Single Burst during Cholinergic Theta Oscillation in CA1 In Vitro," Neuron vol. 15, 1995, pp. 1053-1063.

International Search Report and Written Opinion—PCT/US2012/047481—ISA/EPO—Oct. 18, 2012.

Johnston, S.P., et al., "A Hybrid Learning Algorithm Fusing STDP with GA based Explicit Delay Learning for Spiking Neurons", Intelligent Systems, 2006 3rd International IEEE Conference on, IEEE, PI, Sep. 1, 2006, XP031078858, DOI: 10.1109/IS.2006.348493ISBN: 978-1-4244-0195-6, pp. 632-637.

Kubota et al., "Modulation of LTP/LTD balance in STDP by an activity-dependent feedback mechanism," Neural Network, vol. 22, 2009, pp. 527-535.

Murakoshi, K. et al., "Firing Time of Neuron by Interference Between Synaptic inputs," in International Conference on Systems, Man, and Cybernetics (SMC), 1999, pp. 377-382.

Paugam-Moisy, H., et al., "A supervised learning approach based on STDP and polychronization in spiking neuron networks", ESANN'2007 proceedings-European Symposium on Artificial Neural Networks, Apr. 1, 2007, pp. 25-27, XP055049375, Bruges, Belgium ISBN: 2930307072Retrieved from the Internet:URL:http://www.elen.ucl.ac.be/Proceedings/esann/esannpdf/es2007-95.pdf [retrieved on Jan. 11, 2013] p. 427-p. 432, line 4.

Schemmel J. et al., "Implementing Synaptic Plasticity in a VLSI Spiking Neural Network Model", International. Joint Conference on Neural Networks, 2006. IJCNN '06, Piscataway, NJ: IEEE Operations Center, Piscataway, NJ, USA, Jan. 1, 2006, pp. 1-6. XP002557202, ISBN: 978-0/7803-9490-2 Retrieved from the Internet URL:http://www.kip.uni-heidelberg.de/Veroeffentiichurigen/download.cgi/4620/ps/1774.pdf [retrieved on Nov. 23, 2009].

Senn, et al., "An Algorithm for Synaptic Modification Based on Exact Timing of Pre- and Post-Synaptic Action Potentials," in Proceedings: ICANN, 1997, 6 pgs.

Standage, D., et al., "The Trouble with Weight-Dependent STDP", Neural Networks, 2007. IJCNN 2GG7. International Joint Conference on IEEE, Piscataway, NJ, USA, Aug. 1, 2007, pp. 1348-1353, XP031154790, ISBN: 978-1-4244-1379-9.

Tanaka, H., et al., "A CMOS Spiking Neural Network Circuit with Symmetric/Asymmetric STDP Function", IEICE Transactions on Fundamentals of Electronics,Communications and Computer Sciences, Engineering Sciences Society, Tokyo, JP, vol. E92A, No. 7,

(56) References Cited

OTHER PUBLICATIONS

Jul. 1, 2009, pp. 1690-1698, XP001547503, ISSN: 0916-8508, DOI: 10.1587/Transfun.E92.A.1690 p. 1690-p. 1696, right-hand column.

Brette et al.,"Simulation of networks of spiking neurons: A review of tools and strategies," Springer, Journal of Computational Neuroscience, vol. 23, pp. 349-398, 2007.

Hunzinger, J.V., et al., "Learning complex temporal patterns with resource-dependent spike timing-dependent plasticity", Journal of Neurophysiology, vol. 108, No. 2, Jul. 15, 2012, pp. 551-566, XP055069720, ISSN: 0022-3077, DOI:10.1152/jn.01150.2011 the whole document.

Nageswaran, J.M., et al., "A configurable simulation environment for the efficient simulation of large-scale spiking neural networks on graphics processors", Neural Networks, Elsevier Science Publishers, Barking, GB, vol. 22, No. 5-6, Jul. 1, 2009, pp. 791-800, XP026446158.

Park, H.O., et al., "Discrete Synapse Recurrent Neural Network for nonlinear system modeling and its application on seismic signal classification", Neural Networks (IJNN), The 2010 International Joint Conference on, IEEE, Piscataway, NJ, USA, Jul. 18, 2010, pp. 1-7, XP031771705.

Schaik, A.V., et al., "A log-domain implementation of the Izhikevich neuron model", IEEE International Symposium on Circuits and Systems. ISCAS 2010—May 2-Jun. 2, 2010—Paris, France, IEEE, US, May 30, 2010, pp. 4253-4256, XP031724796, ISBN: 978-1-4244-5308-5 the whole document.

Eurich C W., et al. "Dynamic of Self-Organized Delay Adaptation", Physical Review Letters, vol. 82, No. 7, Feb. 1999, pp. 1594-1597.

Gilson M., et al., "Emergence of Network Structure Due to Spike-Timing-Dependent Plasticity in Recurrent Neuronal Networks. I. Input Selectivity-Strenthening Correlated Input Pathways", Biological Cybernetics, Jun. 2009, pp. 81-102.

Bishop W.B., "Estimating the posterior probability of LTP failure by sequential Bayesian analysis of an imperfect Bernoulli trial model," IEEE Transactions on Biomedical Engineering, vol. 48, No. 6, Jun. 2001, pp. 670-683, XP011007084, D0I: 10.1109/10.923785 Section III.A.1.

Friedrich J., et al., "Dynamics of recurrent neural networks with delayed unreliable synapses: metastable clustering," Journal Of Computational Neur0science, vol. 27, No. 1, Dec. 10, 2008, pp. 65-80, XP019730519, D0I:10.1007/S10827-008-0127-1 Section 2.

Lubenov E.B., et al., "Decoupling through synchrony in neuronal circuits with propagation delays", NEURON, vol. 58, No. 1, Apr. 9, 2008, pp. 118-131, XP055101258, DOI:10.1016/j.neuron.2008.01. 036 Experimental procedures.

Morrison A., et al., "Phenomenological models of synaptic plasticity based on spike timing," Biological Cybernetics, vol. 98, No. 6, Apr. 9, 2008, pp. 459-478, XP019630139, D0I: 10.1007/S00422-008-0233-1 Section 4.1.3.

Beerhold J R., et al., "Pulse-Processing Neural Net Hardware with Selectable Topology and Adaptive Weights and Delays," Neural Networks, IJCNN International Joint Conference on, Jun. 1990, pp. 569-574.

Lam J., et al., "Novel global robust stability criteria for interval neural networks with multiple time-varying delays" Physics Letters A 342. 4, 2005, pp. 322-330.

Liu X., et al., "Global exponential stability of generalized recurrent neural networks with discrete and distributed delays" Neural Networks 19.5, 2006, pp. 667-675.

Qu Y., et al., "Global robust stability of delayed recurrent neural networks" Chaos, Solitons & Fractals 23.1, 2005, pp. 221-229.

Schrauwen B., et al,. "Extending SpikeProp," Neural Networks, 2004. Proceedings. 2004 IEEE International Joint Conference on, vol. 1, no., pp. 475, Jul. 25-29, 2004, DOI: 10.1109/IJCNN.2004. 1379954.

Zidong., et al., "Exponential stability of uncertain stochastic neural networks with mixed time-delays" Chaos, Solitons & Fractals 32.1, 2007, pp. 62-72.

METHOD AND APPARATUS OF ROBUST NEURAL TEMPORAL CODING, LEARNING AND CELL RECRUITMENTS FOR MEMORY USING OSCILLATION

BACKGROUND

1. Field

Certain aspects of the present disclosure generally relate to neural system engineering and, more particularly, to a method and apparatus of robust neural temporal coding, learning and cell recruitments for memory using oscillations.

2. Background

Neurons in a neural system can communicate information temporally using temporal codes in the form of timed spikes. Because of this, methods of coding and decoding and methods of learning such temporal information are of primary interest.

In particular, it is desired to distinguish temporal patterns and, in contrast to other temporal pattern methods, not merely coincidence of inputs or order of inputs. The present disclosure provides methods that are biologically-inspired/consistent but reduced in complexity and capable of coding, decoding, recognizing, and learning temporal spike signal patterns.

SUMMARY

Certain aspects of the present disclosure provide a method of merging a network of spiking neuron circuits with a rule for learning synaptic weights associated with the neuron circuits. The method generally includes providing synaptic inputs into a neuron circuit of the network, wherein each of the synaptic inputs is associated with a synaptic weight of the synaptic weights and a time delay, latching each of the synaptic inputs being weighted and delayed, upon a rise in an input of the neuron circuit comprising the synaptic inputs, and upon the input or upon the neuron circuit spiking based on the rise in the input, applying the learning rule on the latched synaptic inputs to determine a change in the synaptic weight associated with that synaptic input.

Certain aspects of the present disclosure provide an electrical circuit for merging a network of spiking neuron circuits with a rule for learning synaptic weights associated with the neuron circuits. The electrical circuit generally includes a first circuit configured to provide synaptic inputs into a neuron circuit of the network, wherein each of the synaptic inputs is associated with a synaptic weight and a time delay, a second circuit configured to latch each of the synaptic inputs being weighted and delayed, upon a rise in an input of the neuron circuit comprising the synaptic inputs, and a third circuit configured to apply, upon the input or upon the neuron circuit spiking based on the rise in the input, the learning rule on the latched synaptic inputs to determine a change in the synaptic weight associated with that synaptic input.

Certain aspects of the present disclosure provide an apparatus for merging a network of spiking neuron circuits with a rule for learning synaptic weights associated with the neuron circuits. The apparatus generally includes means for providing synaptic inputs into a neuron circuit of the network, wherein each of the synaptic inputs is associated with a synaptic weight and a time delay, means for latching each of the synaptic inputs being weighted and delayed, upon a rise in an input of the neuron circuit comprising the synaptic inputs, and means for applying, upon the input or upon the neuron circuit spiking based on the rise in the input, the learning rule on the latched synaptic inputs to determine a change in the synaptic weight associated with that synaptic input.

Certain aspects of the present disclosure provide a method of regulating a firing rate of a neuron circuit of a neural network. The method generally includes computing periodically the firing rate of the neuron circuit by counting a number of firings of the neuron circuit within a time period, determining whether the firing rate is below a lower bound or above an upper bound, and adjusting the firing rate by a step amount based on the determination.

Certain aspects of the present disclosure provide an electrical circuit for regulating a firing rate of a neuron circuit of a neural network. The electrical circuit generally includes a first circuit configured to compute periodically the firing rate of the neuron circuit by counting a number of firings of the neuron circuit within a time period, a second circuit configured to determine whether the firing rate is below a lower bound or above an upper bound, and a third circuit configured to adjust the firing rate by a step amount based on the determination.

Certain aspects of the present disclosure provide an apparatus regulating a firing rate of a neuron circuit of a neural network. The apparatus generally includes means for computing periodically the firing rate of the neuron circuit by counting a number of firings of the neuron circuit within a time period, means for determining whether the firing rate is below a lower bound or above an upper bound, and means for adjusting the firing rate by a step amount based on the determination.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
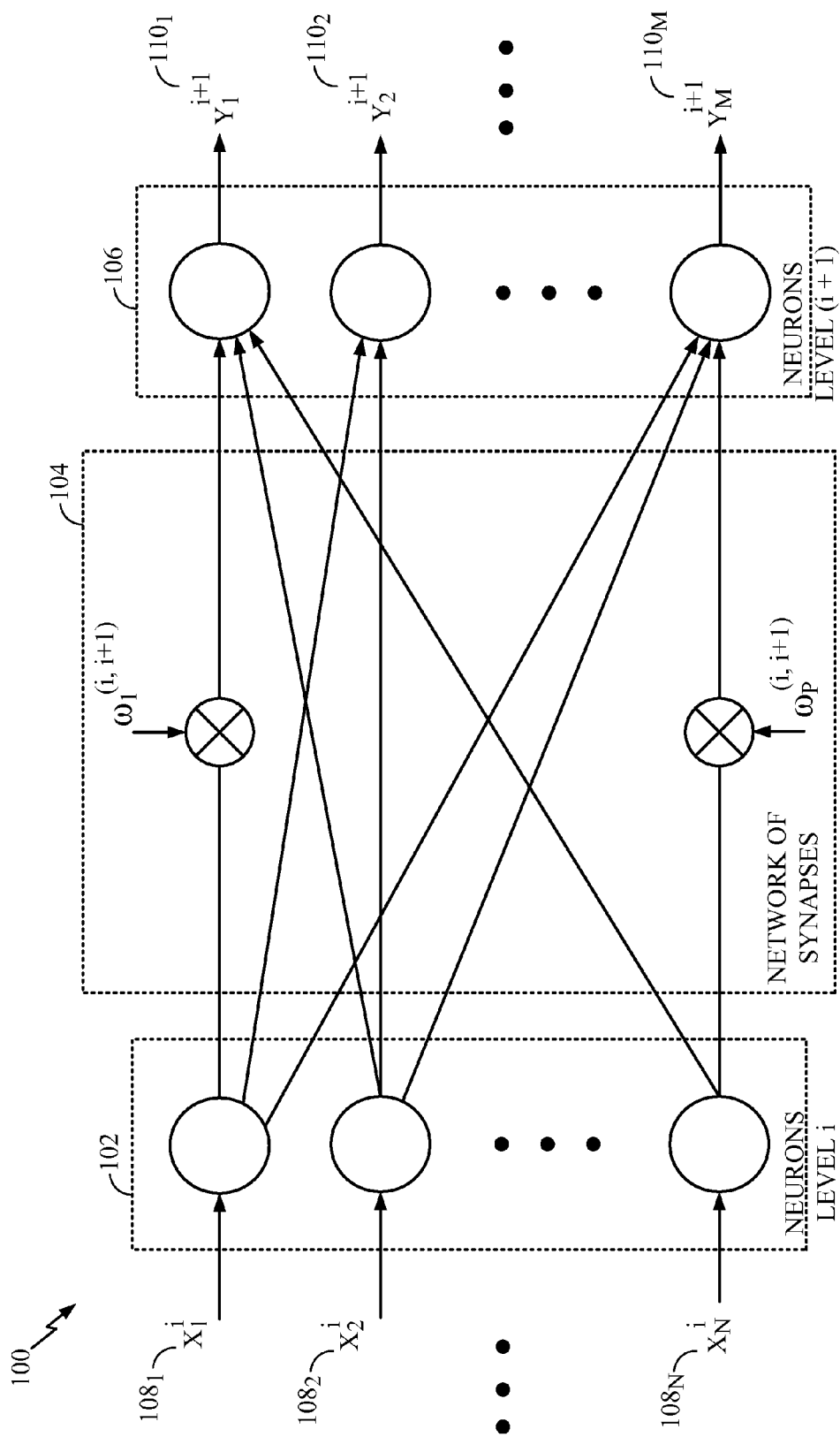
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104. For simplicity, only two levels of neurons are illustrated in FIG. 1, although fewer or more levels of neurons may exist in a typical neural system.

As illustrated in FIG. 1, each neuron in the level 102 may receive an input signal 108 that may be generated by a plurality of neurons of a previous level (not shown in FIG. 1). The signal 108 may represent an input current of the level 102 neuron. This current may be accumulated on the neuron membrane to charge a membrane potential. When the membrane potential reaches its threshold value, the neuron may fire and generate an output spike to be transferred to the next level of neurons (e.g., the level 106).

The transfer of spikes from one level of neurons to another may be achieved through the network of synaptic connections (or simply "synapses") 104, as illustrated in FIG. 1. The synapses 104 may receive output signals (i.e., spikes) from the level 102 neurons, scale those signals according to adjustable synaptic weights $w_1^{(i,i+1)}, \ldots, w_P^{(i,i+1)}$ (where P is a total number of synaptic connections between the neurons of levels 102 and 106), and combine the scaled signals as an input signal of each neuron in the level 106. Every neuron in the level 106 may generate output spikes 110 based on the corresponding combined input signal. The output spikes 110 may be then transferred to another level of neurons using another network of synaptic connections (not shown in FIG. 1).

The neural system 100 may be emulated by an electrical circuit and utilized in a large range of applications, such as image and pattern recognition, machine learning, motor control, and alike. Each neuron in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Since neuron circuits of the neural system 100 may communicate information temporally using so-called temporal codes in the form of timed spikes, the coding and decoding methods as well as methods of learning such temporal information are of primary interest. Certain aspects of the present disclosure support methods for distinguishing temporal patterns and, in contrast to other "temporal pattern" methods, not merely coincidence of inputs or order of inputs. Moreover, the present disclosure propose practical methods that are biologically-inspired/consistent but reduced in complexity and capable of coding, decoding, recognizing, and learning temporal spike signal patterns. In this disclosure, extensions are proposed to a scalable temporal neural model for robustness, confidence or integrity coding, and recruitment of cells for efficient temporal pattern memory. The proposed approach is biologically inspired by experimental evidence of oscillations or rhythms and synchrony, and at the same time, motivated to reduce modeling complexity.

Relative Delay and Dendritic Delay Lines

Figure 2:
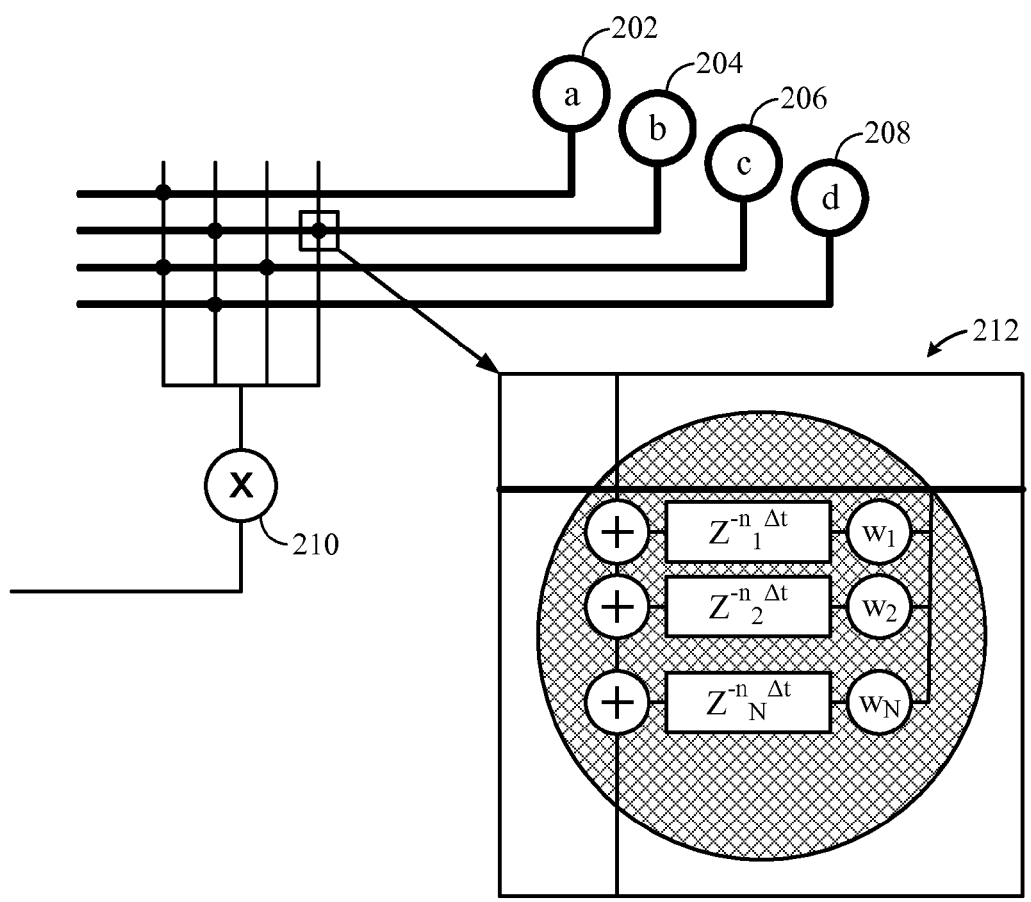
FIG. 2 illustrates an example relative delay neuron model in accordance with certain aspects of the present disclosure.

A method is proposed in the present disclosure in which a neuron's behavior may be determined based on a relative delay between inputs at synapses, a relative delay between inputs at synapses and a reference input, or both. The basic aspect of the temporal coding model is illustrated in FIG. 2. The spatial-temporal pattern of spikes output from neurons 202, 204, 206, 208 (i.e., input neurons) may constitute spike inputs for a neuron 210. Each input neuron may connect to the neuron 210 via one or more synapses on one or more dendrite of the neuron 210. Each synapse may have an associated delay that characterizes the time delay that a spike from the input neuron undergoes before reaching the soma of neuron 210, as illustrated in FIG. 2 for synapses 212 connecting the neuron 204 with the neuron 210. As illustrated in FIG. 2, the inputs may undergo scaling before delay and integration. Alternatively, the inputs may undergo delay before scaling for reduced processing in large-scale networks.

Figure 3:
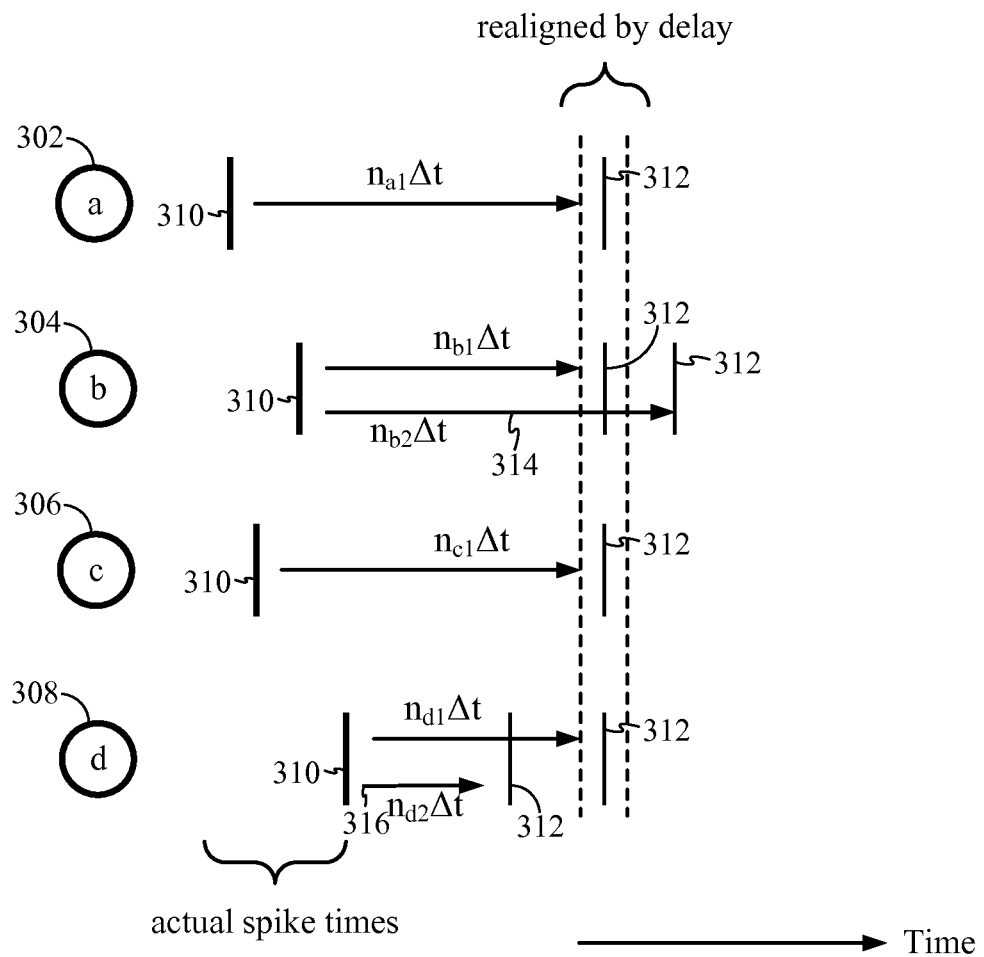
FIG. 3 illustrates an example realignment of relative delay inputs by dendritic model in accordance with certain aspects of the present disclosure.

Using this method, a neuron may recognize spatial-temporal patterns in outputs of input neurons (spatial in the sense of input neurons, temporal in the sense of relative spike timing or temporal differences between spikes). This is illustrated in FIG. 3 where input neurons 302, 304, 306, 308 may spike at different times. However, as a result of delays in the dendrite(s), signals from the input neurons may reach a soma of output neuron x aligned in time. An input to the output neuron x at time t may thus be expressed as a function of delayed outputs of the input neurons, i.e.:

$$u_x(t) = \sum_j w_j v_{i_j}(t - n_j \Delta t), \quad (1)$$

where j is the synapse index, $i_j$ is the input neuron to which synapse j connects, $n_j$ is the synaptic delay in units of $\Delta t$, $v_i(t)$ is the output of input neuron i, and $w_j$ is a synaptic weight. In equation (1), the synaptic delay represents a delay by which a total delay is abstracted. That total delay may be due to one or more (combination of) actual synaptic delays due to a digital-to-analog delay (i.e., a time for conversion from action potential (AP) to post-synaptic potential (PSP)), a dentritic delay (i.e., a passive travel time for the PSP to reach a soma), or other delays (e.g., axonal delays or network architecture delays due to paths through different layers or number of neurons).

Actual timings of firing of the neurons 302, 304, 306, 308 are labeled as 310 in FIG. 3. Because of particular delays corresponding to synapses (i.e., denoted by multiples of time delay resolution $\Delta t$), the input timings after delays may or may not align once the relative delays are accounted for (labeled as 312 in FIG. 3). It can be observed from FIG. 3 that some synapses are associated with delays that are too long (e.g., a synapse with delay 314) or short (e.g., a synapse with delay 316) to coincide with delays of other synapses. In an aspect, these short and long delays may be discarded from or not added to a recognized pattern, while delays that result in coincident delayed spikes may be retained or added to correspond to a recognized pattern.

In the preferred aspect of the present disclosure, discrete time delays of integer milliseconds may be utilized (i.e., delays in multiples of time delay resolution $\Delta t=1$ ms). However, in general, any discrete or continuous resolution may be used. In the discrete model, the delay may be represented by the integer $n_{xi}$, where x is the input neuron (e.g., the neuron 302 in FIG. 3), and i is the synapse index for that input neuron since there may be one or more synapses to each input.

In the following, it will be shown how to learn spatial temporal patterns in a robust manner.

Spike-Based Hebbian Learning Method

A robust reduced method for temporal coding and learning is first proposed in the present disclosure. Then, this method may be utilized as a basis for a method of further robustness using oscillations and rhythms. In an aspect of the present disclosure, these two methods can be used together for cell recruitment for memory.

Hebbian learning rules typically operate based on rate-coding or other windowed neuron models, adjusting synapse weights based on firing output over a trial time window. However, spike-based models may be used to reproduce precise timing behavior of neurons, which may fire with particular delays not necessarily coincident with particular inputs responsible for causing the firing. Methods used in the reduced model allow reconciling these differences.

In general, Hebbian learning refers to learning that associates (wires together) an input with an output when they occur simultaneously. However, a variety of such rules and related variations can be considered relevant for the methods being proposed in the present disclosure because of particular temporal aspects. With rate-coding, one might consider two neurons that are generally firing during a time window for association according to Hebbian principles. However, in the proposed methodology, the relative timing of individual spikes may be considered. Moreover, because a neuron may fire with some delay after inputs (causality), "simultaneity" may not be necessarily the optimal associative condition when considering behavior at the individual spike level. This may be important for the reasons discussed below.

Learning synaptic weights can be typically referred to as synaptic plasticity. For the Spike-Timing-Dependent Plasticity (STDP), synaptic weight adjustments in learning can be typically described in terms of a time difference between when a pre-synaptic input spike occurs and when a post-synaptic neuron fires, referenced by $\Delta T$. Here, the convention can be used that a positive value means that the pre-synaptic input fired after the post-synaptic neuron. The learning can be expressed as a curve describing the amount and direction of weight adjustment across a range of time difference values. It should be noted that a standard STDP curve has a discontinuity at the origin.

Figure 4:
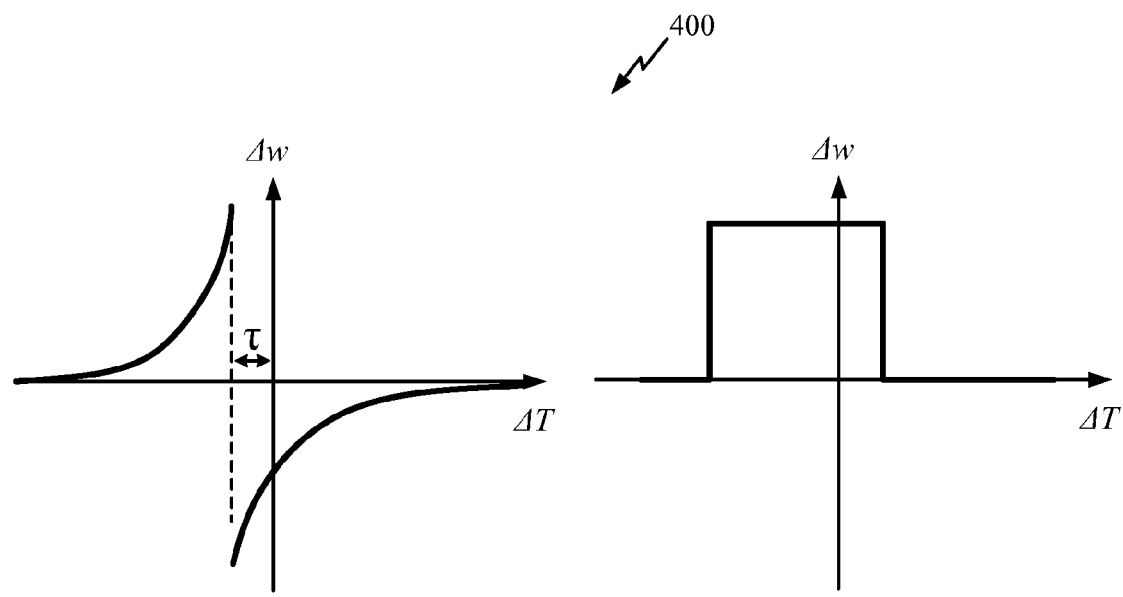
FIG. 4 illustrates an example temporal shift of learning curves in accordance with certain aspects of the present disclosure.
Figure 5:
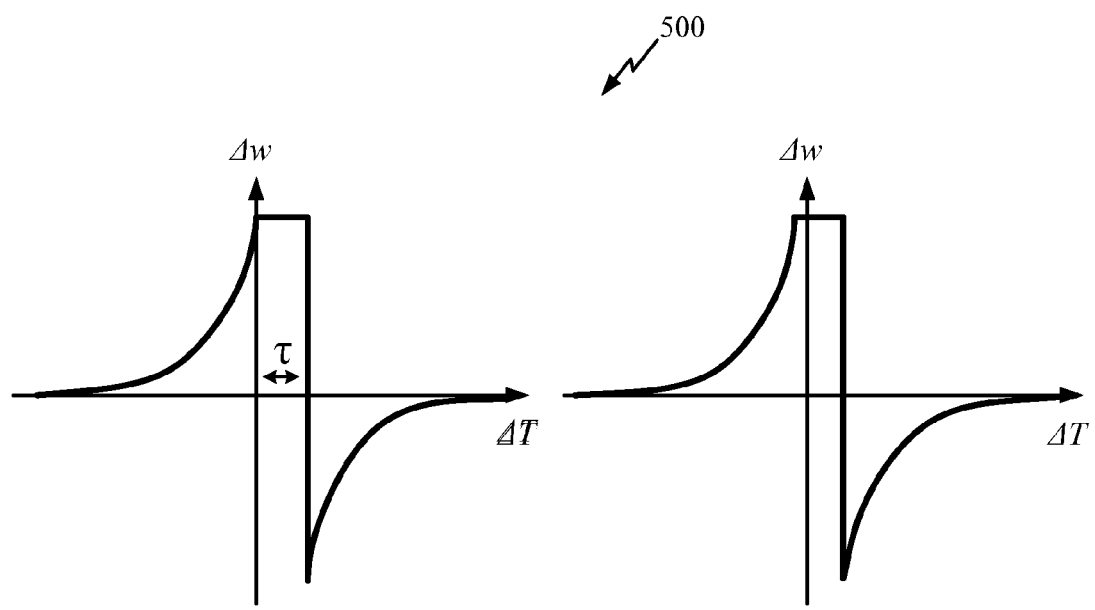
FIG. 5 illustrates an example temporal shift and sensitivity damping of learning curves in accordance with certain aspects of the present disclosure.

However, an important aspect of learning curves may be shift. Examples of shifted curves are illustrated in FIG. 4 and FIG. 5. FIG. 4 illustrates an example 400 of temporal shift of learning curves in accordance with certain aspects of the present disclosure. FIG. 5 illustrates an example 500 of temporal shift and sensitivity damping of learning curves in accordance with certain aspects of the present disclosure. It should be noted that the shift may be combined with other aspects, such as reinforcement or de-emphasis variations or other shape aspects.

Such shifting of the weight learning curve can be motivated for a variety of reasons. First, it may be desired to accommodate neuron depolarization delays (time constant of the soma, for example). In other words, if firing is delayed as in biologically motivated dynamic models of neurons, it may not be necessary to reinforce synaptic weights for extraneous inputs that may happen to arrive after the sufficiently depolarizing inputs but before the neuron fires. This may be prevented by shifting the curve toward the left, as illustrated in FIG. 5, which may hold the neuron from sliding forward toward the extraneous input times. Second, it may be desired to control (limit) a sliding effect that may occur if a neuron learns a part of a pattern and starts precession toward an earlier part of the pattern because of a nominal learning curve shape (i.e., reinforcing synapses with earlier and earlier input arrivals thus causing firing to occur earlier and earlier). This may be prevented by shifting the curve to the right reinforcing a narrow window of non-causal inputs, which may hold the neuron from sliding backward.

Typical Hebbian plasticity rules applied in the field of theoretical neuroscience, such as the Oja rule or the BCM rule (Bienenstock-Cooper-Munro rule) and their variations have weight regulation effects, which may stabilize the learning resulting from these rules. For example, the Oja's rule may provide weight change (as a vector) given by:

$$\Delta w = v \cdot (u - \alpha v w) \cdot \tau, \quad (2)$$

where v is a neuron's output and u is a neuron's input, $\tau$ is a time constant controlling weight adaptation (learning) rate and $\alpha$ is a parameter that controls normalization. It can be noticed that at the steady state $u = \alpha v w$. Therefore, for coinciding input and output, the weights may be normalized to the value of $1/\alpha$. This may have an effect of regulation or so-called homeostasis. It is proposed in the present disclosure that neuronal regulation or homeostasis (e.g., maintaining a long-term firing rate constant) is an important component. Thus, when using STDP or curves such as those illustrated in FIGS. 4-5 (as opposed to the Oja or BCM rules), the addition of neuronal regulation or homeostasis may be important.

Regarding homeostasis, it may be recommended that rather than targeting a particular firing rate, neurons may be allowed to operate in a firing rate range. Thus, it is proposed in the present disclosure that thresholds (or inputs) are scaled only if the rate falls beyond an upper or a lower range. This may provide stability as well as flexibility to different pattern densities. Thus, it is proposed that such adjustment is slow, i.e., occurring in the order of at least multiple pattern exposures and applied in steps.

However, it can be observed that the STDP-like effects (curves) may be reproduced without actually applying such learning curves directly (i.e., a reduced complexity model). Rather, using such Hebbian rules as the Oja rule, when combined with a dynamic spiking neuronal model such as the Izhikevich's simple model, it may be possible to observe the temporal learning curve effects discussed above (whether similar to the experimentally observed STDP curves or the variations discussed).

Figure 6:
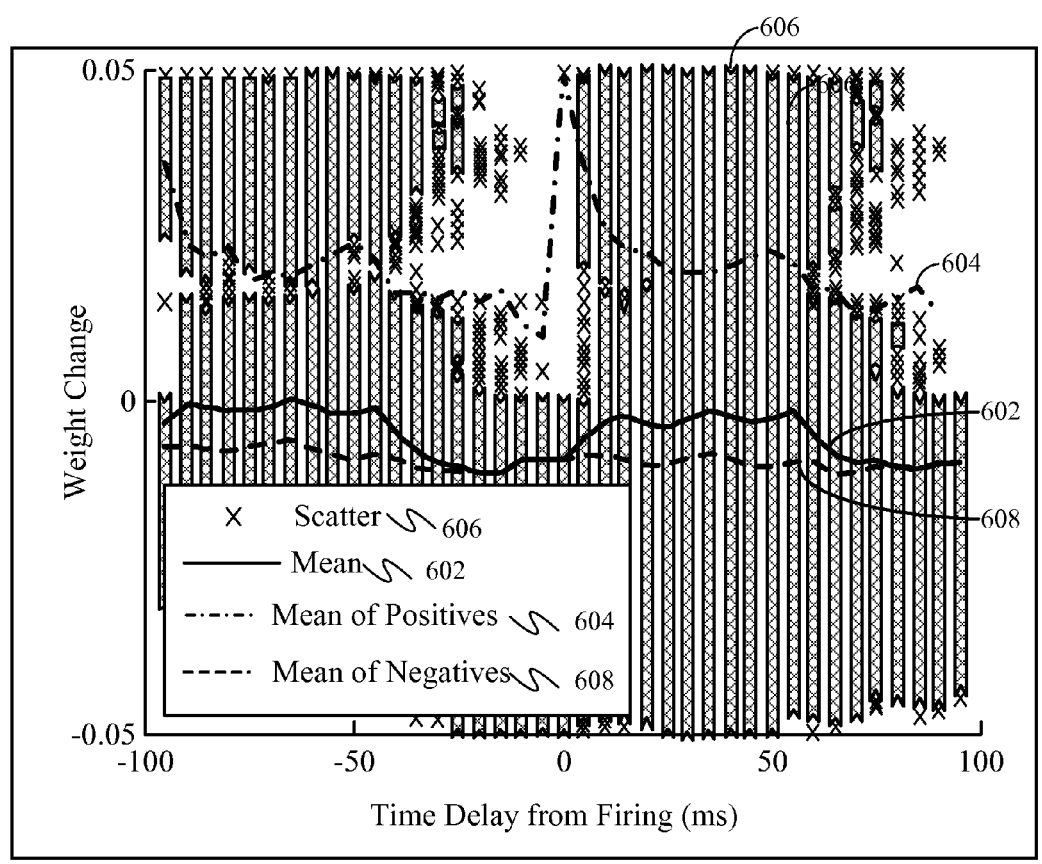
FIG. 6 illustrates example learning curves resulting from dynamic spiking Hebbian rule method in accordance with certain aspects of the present disclosure.

An example of learning curves resulting from dynamic spiking Hebbian rule method is illustrated in FIG. 6. It should be noted that while there are similarities with the biologically observed (idealized) STDP curves, there may exist differences not inconsistent with raw biological observed data where the actual data points are somewhat scattered near zero. This may also represent motivation to consider such different curves as described above. In an aspect, weights may be initially set high to encourage excitability and accelerate learning and the distribution of delay response. Observing a mean curve 602 and a mean of positive changes curve 604 illustrated in FIG. 6 may provide insight that the optimal temporal plasticity curve may not be exactly as typically rendered. It can be observed a relatively flat tail of curve 604 as limited negative impact for non-causal (leftward) delays.

However, obtaining these effects without applying the learning curve directly may require a critical component, namely that inputs are latched. The latching may be critical because such learning rules as the Oja or BCM rules may typically assume inputs and outputs in terms of firing rate, whereas a dynamic spiking model may spike after some delay from the inputs. One way to accomplish this may be to latch inputs when the total input increases and maintain the latch until firing. Then, the latch contents and firing may be utilized according to the learning rule.

Aspects of the above can be seen in the following reduced model of temporal plasticity. The diagram illustrated in FIG. 6 overlays a scatter plot of weight changes 606 with the mean weight change 602, the mean positive weight change 604 and a mean negative weight change 608 depending on the delay between firing and the input (at the synapse). The latch operation may be described mathematically as:

$$iff \frac{du(t)}{dt} > 0, \text{ then } u_{latch} = u(t). \quad (3)$$

When applying the Oja learning rule (or the BCM or other rule), instead of using the current values of inputs at the time of firing u(t), the latched version of inputs $u_{latch}$ may be used. This may have several advantages. First, it may not be required to store time stamps and compute time delays in order to apply the learning curve. Moreover, a small memory (latch) may be utilized. This may work because the input may increase before a neuron fires again (e.g., in the dynamic spiking model). Furthermore, variations on this latch condition may be used. For example, the largest total input since the last firing may be utilized, wherein it is being referred to the input post dendritic delay.

Learning Stability

Whether applying a Hebbian rule or STDP-like effects, it is proposed in the present disclosure that weights should be allowed or even designed to polarize (e.g., bipolar tendency to zero or one upon stable learning of a pattern). In other words, it is proposed that a learning rule should polarize weights on learning neurons and depolarize weights for non-learning neurons (neurons reserved for other memories or losing a competition to code a given pattern).

The reason for this is that the bipolar state (weights tending to zero or one) resulting from application of learning rules (STDP, Hebbian or otherwise) may have stability advantages when learning multiple patterns or sub-patterns. This may relate to the learning rule nature (e.g., additive or multiplicative nature). In an aspect, a neuron may be exposed to a pattern that it then learns according to the proposal and thus reaches a bipolar weight state. Subsequent exposure of this neuron with such bipolar weights (having learned that prior stimulus) to a new stimulus (a different temporal pattern) may provide less chance of disturbance of the weights. Thus, it may be less likely for the neuron to unlearn the prior pattern than if the learning rule left the weights distributed between zero and one (not bipolar).

Technically, this may occur because for the weights at or near zero, being multiplied by a learning factor to reinforce them counter to the prior pattern, the change may be minimal due to the weight being at or near zero. In addition, for the weights near one, being multiplied by a learning factor less than one to deemphasize them counter to the prior pattern, the change may be minimal due to the weight being at or near one. On the other hand, naive synapses, with weights in the middle range (or depolarized), may be much more likely to be recruited for a new pattern. In general, it is thus proposed that whatever method is used to adjust weights, that (a) weights should polarize on competitive winning (learning a given pattern), (b) depolarize otherwise (neurons not allocated to learn the given pattern) and (c) the learning rule should be designed such that polarizing weights may not be easily depolarized.

Improving Robustness and Confidence

Figure 7:
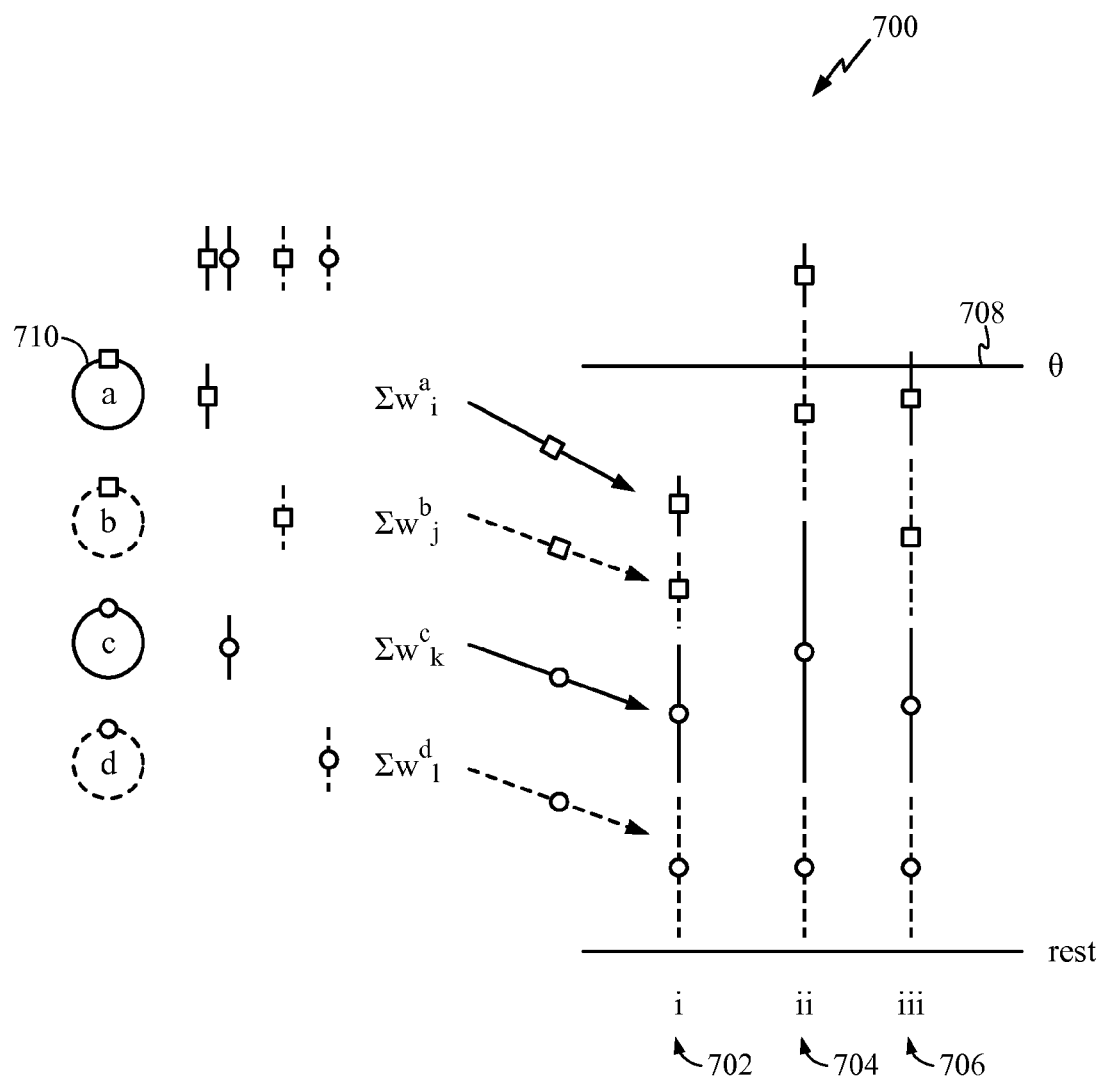
FIG. 7 illustrates an example of robustness aspects of the relative delay neuron model in accordance with certain aspects of the present disclosure.

Certain aspects of the present disclosure support a method of efficiently measuring the confidence or robustness of a pattern match and a way to translate that into a temporal code. FIG. 7 illustrates an example 700 for three cases of coincident inputs to a neuron's soma of varying magnitudes as a result of synaptic weights, dendritic delays, and combining when exposed to the same pattern.

It should be noted that in order to exceed a firing threshold, the combined coincident input may generally need to exceed a threshold (relative to resting potential). The contribution of weights, threshold, and number of synapses is depicted in the further description. In a case 702 illustrated in FIG. 7, there may be too few coincident synapses (or too few weights, or a threshold may 708 be too high). In a case 704, the opposite may occur. Only in a case 706 the match may be perfect. The case 704 may be considered being either loose (redundant) or robust depending on perspective, context or noise level. Similarly, the case 706 may be considered perfect (precise or efficient) or sensitive (brittle, non-robust).

It should be also noted that for a given firing, the total contribution of a single input neuron may be determined by the total of synapses with coincident delay (not merely relative to one another but relative to the combination with other inputs) and their weights. If the total coincident input across input neurons for those synapses is below the threshold 708, then firing may not occur. On the other hand, if the total coincident input across input neurons for those synapses is above the threshold 708, then the firing may occur. This may be problematic, as it can be observed from FIG. 7. If, as depicted as the case 704, some parts of the pattern may not be necessary for firing, such as an input pattern from a neuron 710. Thus, the pattern match confidence may be low.
Solution to Robustness It is proposed in the present disclosure a combination of one or more aspects to solve these aforementioned problems related to robustness. First, neuronal regulation or homeostasis may be used to control or normalize total contribution of contributing inputs, in terms of number, weight or otherwise. Thus, a neuron's input level may be adjusted for the target pattern to correspond to the case 706 from FIG. 7 (i.e., sufficiently at or above the threshold 708, but not too far over to result in firing without the correct pattern). In fact, the input level may be adjusted by scaling the weights. Also, these weights may be adjusted to give the desired robustness (excess input). This can be a building block for the following description of a confidence or integrity coding method.

Figure 8:
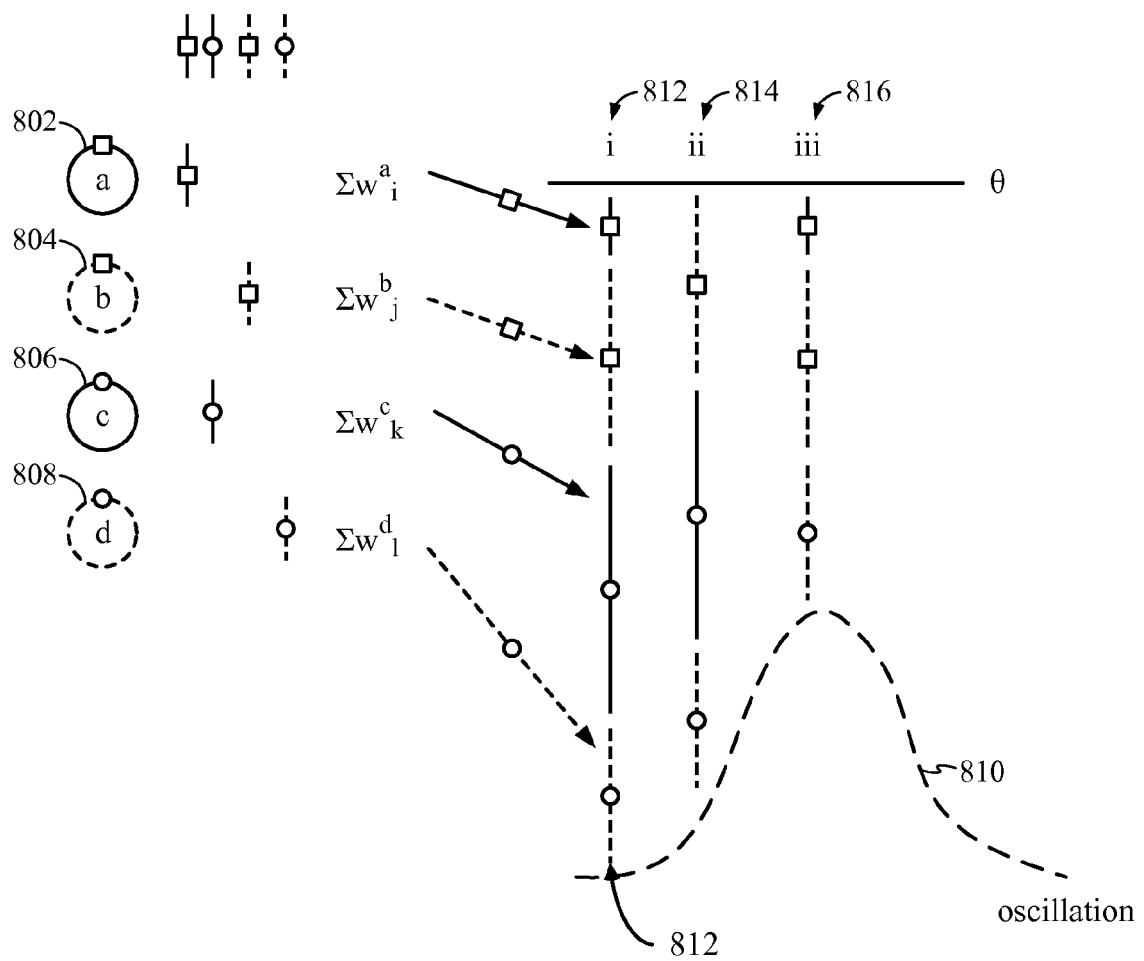
FIG. 8 illustrates an example single oscillation as a basic catalyst for integrity coding in accordance with certain aspects of the present disclosure.

It may be desired that an output neuron x matching a temporal spike pattern of input neurons 802, 804, 806, 808 illustrated in FIG. 8. It can be noticed that if an oscillation 810 is introduced in a membrane potential or a firing threshold, depending on the phase during which the output neuron x considers the inputs may determine how precise the input may need to be to match the pattern. In an aspect, the most precision may be required at a trough 812 of the oscillation 810. However, at 814 or even 816, less precision may be required to fire the neuron. For example, at 814, a spike from the neuron 802 may be missing entirely, and, at 816, a spike from the neuron 806 may not be required.

Figure 9:
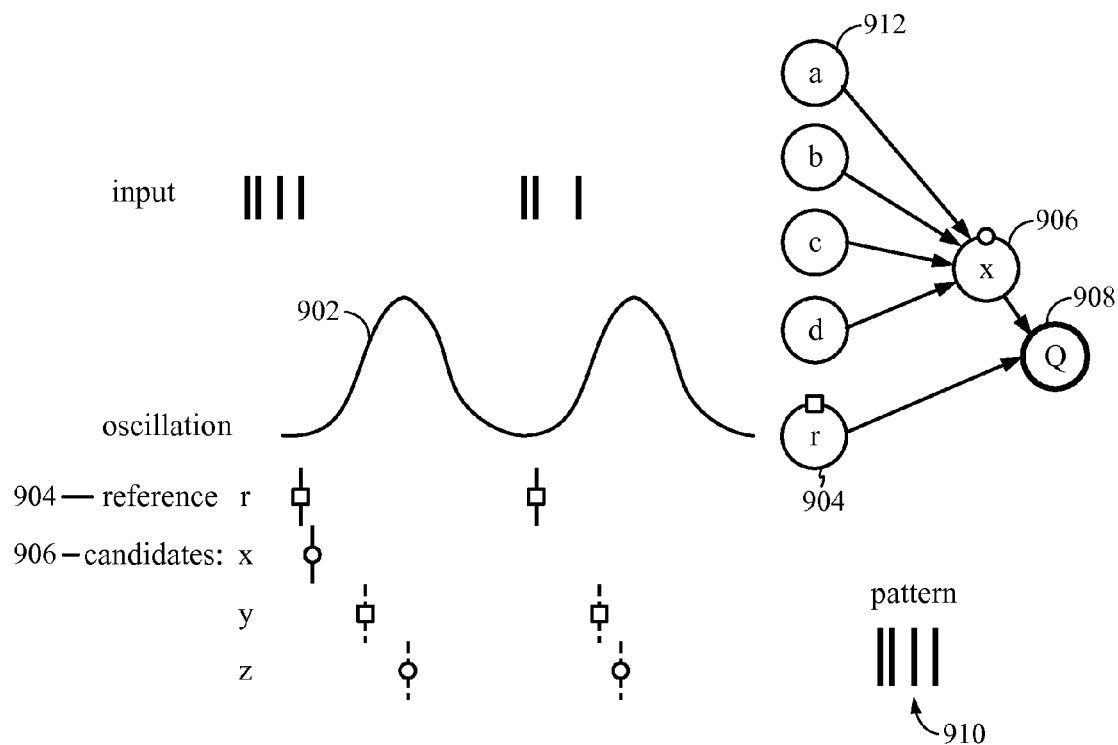
FIG. 9 illustrates an example oscillation reference and integrity temporal coding in accordance with certain aspects of the present disclosure.

Next, a reference firing may be included, as illustrated in FIG. 9. An oscillation 902 in combination with a reference neuron firing 904 (e.g. at a trough of the sinusoid 902) may be used to convert confidence into a temporal code. As illustrated in FIG. 9, the closer the pattern recognizing neuron fires to the reference (trough) 904, the better the match. Therefore, if an output of the reference neuron 904 and an output of a matcher neuron 906 are fed into a neuron 908, then a temporally coded output of the neuron 908 may be used as a confidence measure of detecting a spiking pattern 910.

The key aspects of the pattern 910 may be in the spike timing of input neurons 912, 914, 916, 918. In addition, the reference neuron 904 may fire on a particular phase based on the oscillation 902. The confidence in the match may be evaluated by the neuron 906, but submitting the output of neuron 906 and the reference neuron 904 to the neuron 908 that can learn (or be configured) with delays corresponding to the alignment. For example, one possible configuration can be such that if the output of neuron 906 aligns with the oscillation trough, then the neuron 908 may fire, and otherwise it may not. This example shows that in general any correspondence to oscillation phase may be determined and temporally coded.

It should be also noted that if the candidate x (or another variant y or z) fires during an up-wave (or down-wave) of the oscillation 902, then the pattern 910 may not be exactly matching. In an aspect, by matching the temporal difference to the reference time, the neuron 908 may be easily configured (or learned) to temporally code that poorer quality. It can be noticed that the temporal coding neuron model is utilized as the basis for all of these neurons.

Figure 10:
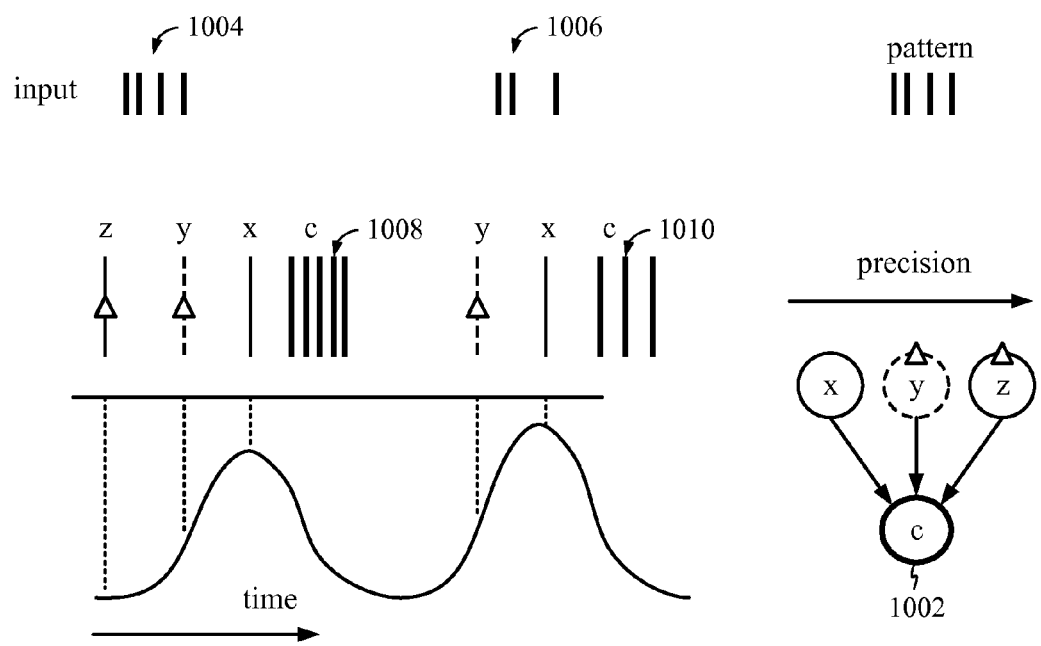
FIG. 10 illustrates an example oscillation reference and integrity rate coding in accordance with certain aspects of the present disclosure.

Essentially, confidence may be a function of oscillation phase, membrane time-constant, and the number and weights of coincident inputs. Hence, oscillation may be used to (a) increase or decrease the sensitivity to the number of inputs, (b) increase or decrease the sensitivity to coincidence of inputs, or (c) both.
Probabilistic Confidence and Rate Coding It should be noted that the confidence may be coded as a rate code by using a bank of neurons having a range of sensitivities to pattern matching accuracy or confidence. The combined spiking of the neurons may act as an aggregate spike count or rate code of the confidence (i.e., more neurons firing means more confidence). For this purpose, outputs of the bank of varying-precision neurons may be fed to a rate coding confidence neuron 1002, as illustrated in FIG. 10. FIG. 10 illustrates two pattern cases 1004 and 1006, where the first pattern case 1004 may have an input matching the pattern so all precision neurons fire and the confidence may be rate-coded into a high rate spike pattern 1008 from the neuron 1002. In the second case, the pattern 1006 may not match as well, so only a subset of neurons may fire and the neuron 1002 may rate codes to a slower rate, as illustrated by a spike pattern 1010.

In an aspect of the present disclosure, the neuron 1002 may fire a train of spikes in a number or rate that is a function of the number of inputs. This may also be combined with the aforementioned method of temporal-coding in various combinations (stages or pieces of network architecture) to achieve desired high-level robustness effects.

Recruiting Cells for Memories

Figure 11:
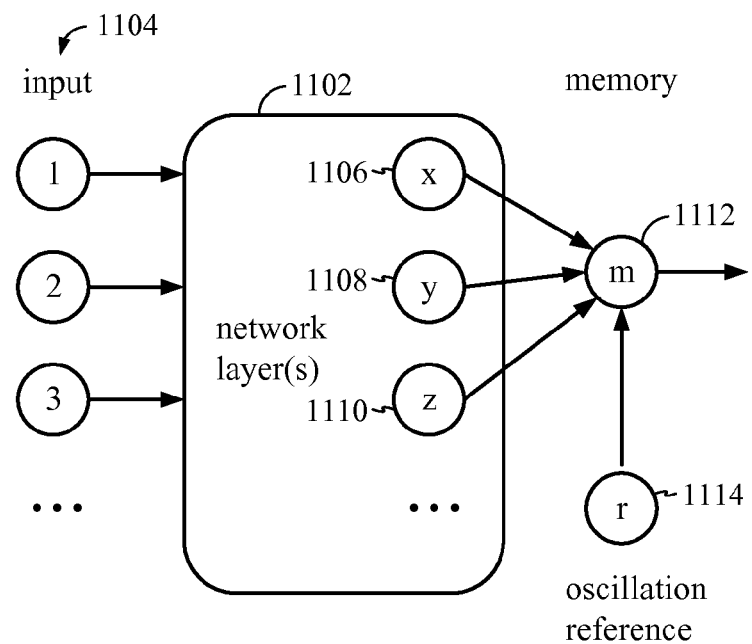
FIG. 11 illustrates an example of connectivity for recruitment of a particular cell for memory in accordance with certain aspects of the present disclosure.

It is further proposed in the present disclosure that the aforementioned concepts of integrity or confidence and precision are particularly relevant for memory aspects. FIG. 11 illustrates a network 1102 of a large number of interconnected neurons, which may be exposed to a particular input that is desired to be remembered by the network 1102. An important question to answer is whether it is necessary for the network 1102 to remember (code) the output of every single neuron in order for it to be able to recognize this input the next time the network is exposed to this particular input pattern. Another important question to answer is whether it is necessary for the network to remember (code) the output of all of its highest-layer (output) neurons.

It is suggested in the present disclosure that such a global or large scale memory is not only unnecessary but also inefficient. Instead, a method is proposed by which a few (even one) neuron's output may be sufficient to remember the input pattern. It is also disclosed how such a cell or cells recruited by a network system and a memory can be learned.

A method is proposed in the present disclosure to identify a key neuron or neurons for a memory by using, in part, the above proposed confidence method. It is shown how applying an oscillation can identify which neurons are particularly tuned to exact pattern(s) by either the temporal confidence code or probabilistic/rate code. Thus, it may be possible to identify and recruit this cell or cells for a particular memory. This particular cell or cells may be then connected (weights reinforced) to the memory cell inputs to be learned. With a memory cell bank and lateral inhibition, highly efficient storage of many patterns may thus be achieved.

This can be explained in the context of FIG. 11 where the network layer or layers 1102 are abstracted. Inputs 1104 may be fed to the network 1102, and neurons 1106, 1108, 1110 may represent few neurons in the network 1102. It may be possible to determine which is the most precise temporal coding match for a given input, and assign that as a dominant (or only) input for a memory cell (e.g., the neuron 1106). In a sense, the neuron 1106 can be called the "memory neuron", but the m cell 1112 is referred to as the memory cell because it may code the coincidence of oscillation reference 1114 and the output of neuron 1106.

This selection process may be also performed with the Hebbian learning rule. Accordingly, coincident input and output may be wired together so that a memory neuron learns the coincidence. In this case, many network neurons may be initially connected to one or more memory cells, and then the correspondence with the reference may be learned by adapting weights. For example, in FIG. 11, a weight of synapse connecting the neuron 1106 and the cell 1112 may represent a strong weight. It should be noted that a temporal pattern model may not be required for the memory neuron because the temporal coding may occur in the network layers. This can be explained in the context of FIG. 12.

Figure 12:
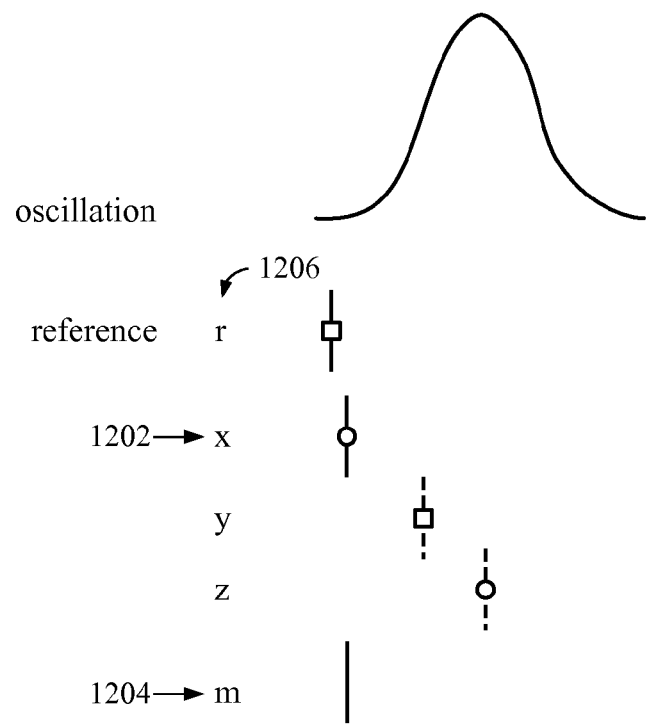
FIG. 12 illustrates an example temporal view of recruitment of a particular cell for memory in accordance with certain aspects of the present disclosure.

In FIG. 12, it is apparent that a neuron 1202 most precisely codes the input pattern because it fires with the least offset from the oscillation trough. If a memory cell with minimal temporal coding delay range (i.e. mainly a coincidence coder) is used (i.e., a memory cell 1204), then the memory cell 1204 may be trained to fire for the most coincident input, which would be inputs 1202 and 1206. Thus, a mechanism may be developed in the present disclosure for remembering an input pattern with minimal resources (neurons).

Robustness over Long Time Frames

Figure 13:
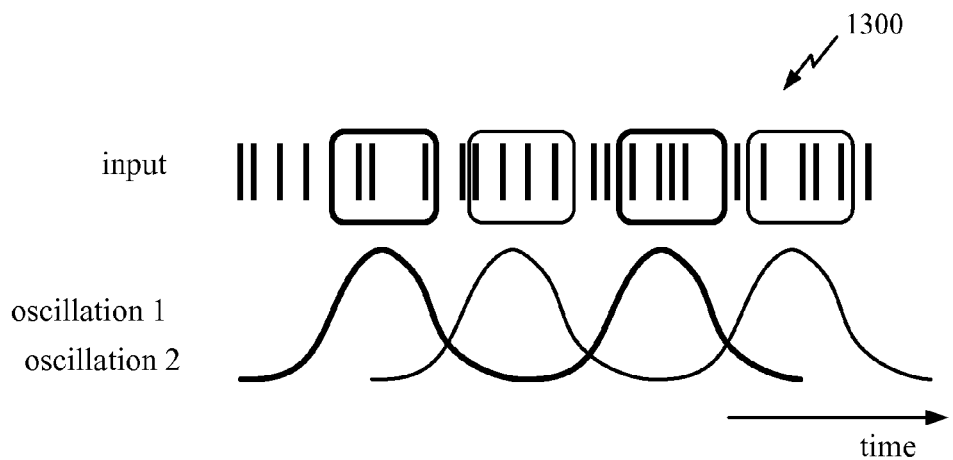
FIG. 13 illustrates an example of using oscillation to separate a temporal pattern into highly resolvable sub-patterns in accordance with certain aspects of the present disclosure.

Furthermore, it is proposed in the present disclosure that by feeding an input to different parts of a network subject to different oscillation frequencies or offsets (example shown in FIG. 13), these parts of a temporal pattern of input may be separated (isolated) for robust pattern matching within those network parts and then the results may be recombined. In a highly efficient network, this may even occur by passing the pattern matching back and forth between two network parts as the oscillation peaks in one or the other.

A network may also be configured with only one oscillation and merely sample parts of a pattern but thereby separate the pattern into clearly separated parts in order to "clear" individual neuron states between sections and improve coding/recognition fidelity.

Temporally Correlated Memories

In an aspect, two temporally coded symbolic memories can be considered, which are desired to be connected (associated) to each other. In an aspect, oscillation (rhythms) may be used to re-align neuronal assemblies to obtain any desired overlap that can be encoded temporally. To understand how to do this, the temporal-confidence coding building block described above can be considered.

Figure 14:
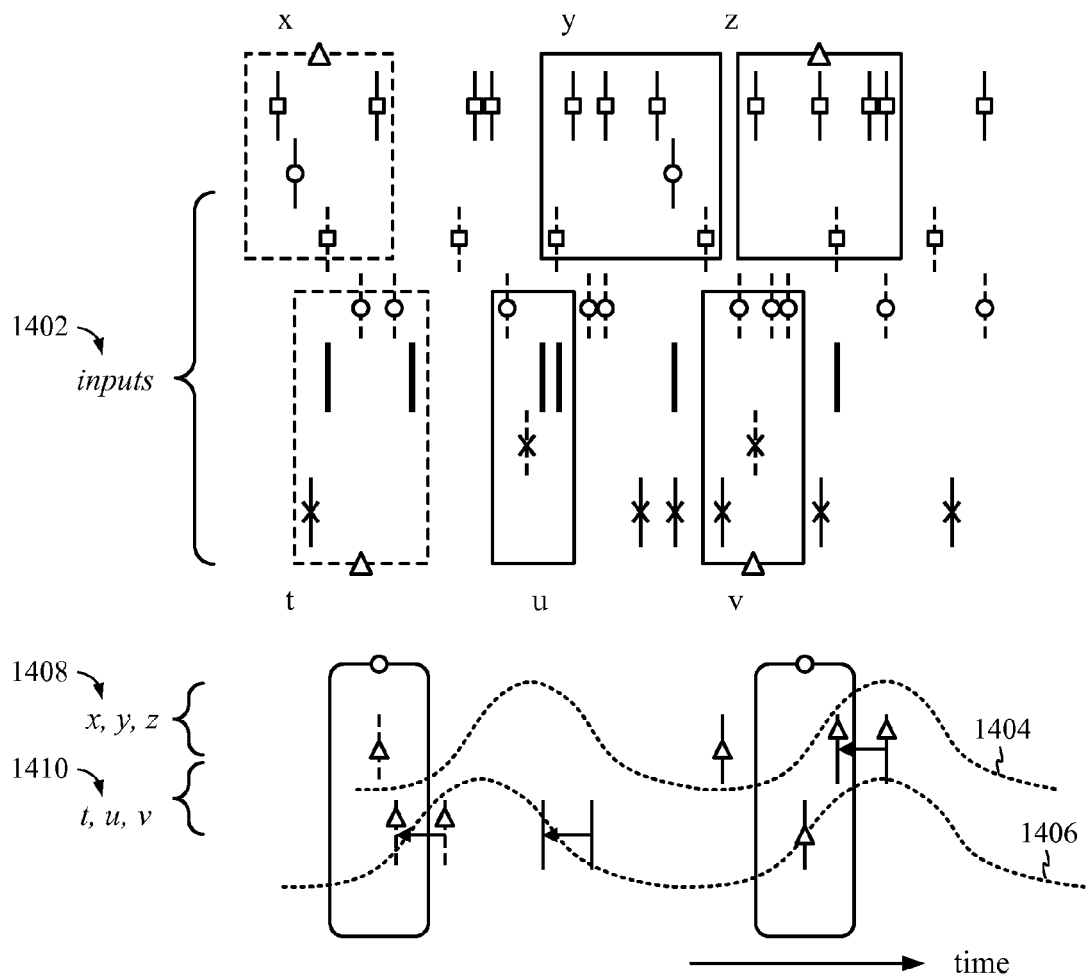
FIG. 14 illustrates an example of using oscillations to associate patterns in accordance with certain aspects of the present disclosure.

FIG. 14 illustrates a spatial-temporal input pattern 1402 with rectangles indicating portions of the pattern recognized by particular neurons (in the absence of oscillation, i.e., high fidelity). Now, two oscillations 1404-1406 may be added, each rhythm applied to two circuits—one circuit comprising neurons 1408 and another circuit comprising neurons 1410. If these two sets of neurons are considered to be two temporal confidence codes, these neurons may be brought into alignment for a secondary coincidence coding by (phase) shifting or scaling (changing the frequency) of the oscillation. It should be noted that with oscillation up-phases, the neurons may fire earlier because of the less stringent conditions. By bringing the two into a resolvable time window, then their association may be coded.

Figure 15:
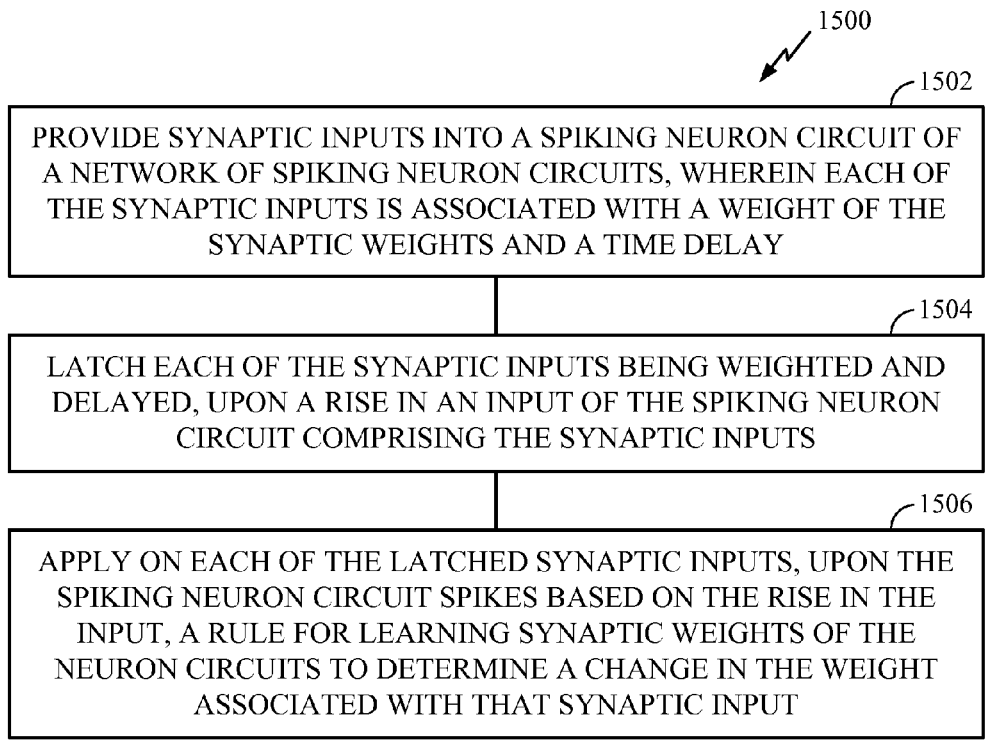
FIG. 15 illustrates example operations that may be performed at a network of neuron circuits in accordance with certain aspects of the present disclosure.

FIG. 15 illustrates example operations 1500 that may be performed at a network of spiking neuron circuits for merging the network with a rule for learning synaptic weights associated with the neuron circuits in accordance with certain aspects of the present disclosure. At 1502, synaptic inputs may be provided into a neuron circuit of the network, wherein each of the synaptic inputs may be associated with a synaptic weight and a time delay. At 1504, each of the synaptic inputs being weighted and delayed may be latched upon a rise in an input of the neuron circuit comprising the synaptic inputs. At 1506, upon the input or upon the neuron circuit spiking based on the rise in the input, the learning rule may be applied on the latched synaptic inputs to determine a change in the synaptic weight associated with that synaptic input.

In an aspect, that weighed and delayed synaptic inputs may be latched when the input of neuron circuit is at a largest value since the neuron circuit fired last time. According to certain aspects of the present disclosure, the learning rule may correspond to one of real-valued Hebbian learning rules, such as the Oja learning rule. Further, the applied learning rule may polarize the synaptic weight associated with that synaptic input. Also, the learning rule may be associated with a shifted STDP learning curve to compensate for a delay from a defined level of depolarization of the synaptic inputs to spiking of the neuron circuit.

In an aspect, the time delay may be equal to one or more multiples of a time delay resolution. The input of neuron circuit may comprise a sum of the synaptic inputs, wherein each of the summed synaptic inputs may be associated with a synapse characterized by the weight and the time delay (e.g., as defined by equation (1)).

In one aspect, the neuron circuit and the synaptic inputs may be associated with a dynamic spiking neuron model. In another aspect, the neuron circuit and the synaptic inputs may be associated with a leaky-integrate-and-fire neuron model.

In an aspect of the present disclosure, as illustrated in FIG. 9, a difference in time between firing of the neuron circuit and firing of a reference neuron circuit of the network may be utilized to temporally code an output of another neuron circuit of the network. The temporally coded output may comprise information about a confidence that a spiking pattern of the synaptic inputs matches a defined pattern, while outputs of the neuron circuit and the reference neuron circuit may be fed into the other neuron circuit to generate the temporally coded output. In another aspect, as illustrated in FIG. 10, an output of the neuron circuit may be provided into another neuron circuit of the network to generate an output of the other neuron circuit. Then, a firing rate of the output of other neuron circuit may indicate a confidence that a spiking pattern of the synaptic inputs into the neuron circuit matches a defined pattern.

In one aspect of the present disclosure, as illustrated in FIGS. 11-12, one of the neuron circuits may be selected as a memory cell to memorize a spiking pattern fed into the network, while oscillation may be applied at an input of a reference neuron circuit of the network. The selection may be based on that neuron circuit responding to the spiking pattern closest to a trough of the oscillation among a set of the neuron circuits.

Figure 16:
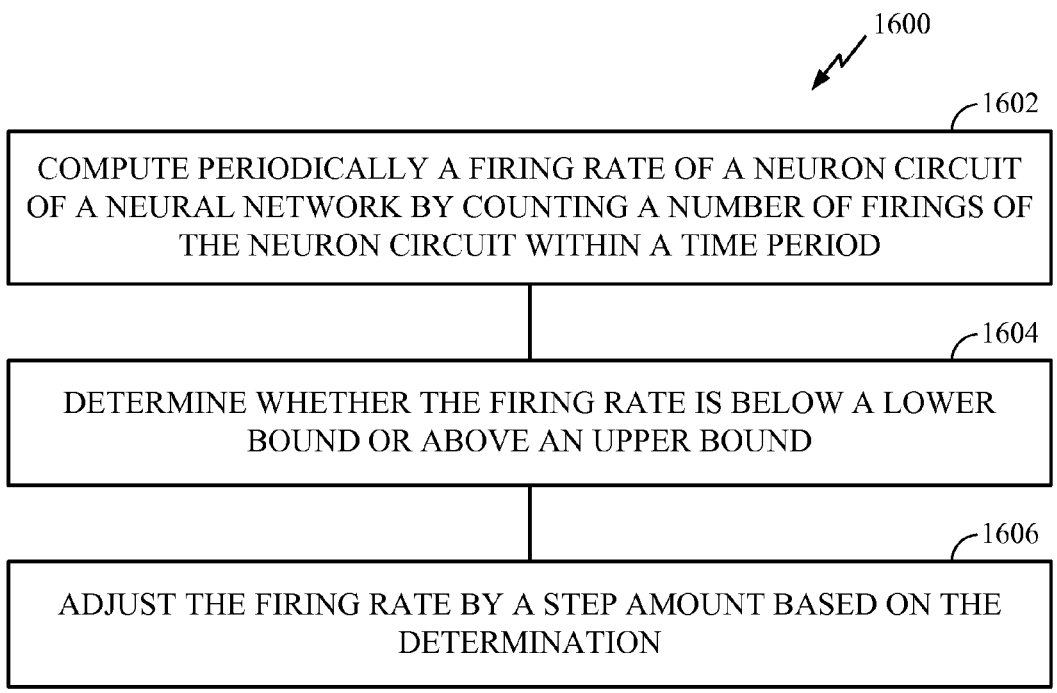
FIG. 16 illustrates other example operations that may be performed at a neuron circuit of a neural network in accordance with certain aspects of the present disclosure.

FIG. 16 illustrates example operations 1600 that may be performed at a neuron circuit of a neural network in accordance with certain aspects of the present disclosure. At 1602, a firing rate of the neuron circuit may be computed periodically by counting a number of firings of the neuron circuit within a time period. At 1604, it may be determined whether the firing rate is below a lower bound or above an upper bound. At 1606, the firing rate may be adjusted by a step amount based on the determination.

In an aspect of the present disclosure, adjusting the firing rate may comprise boosting the firing rate, if the computed firing rate is below the lower bound. In another aspect, adjusting the firing rate may comprise dampening the firing rate, if the computed firing rate is above the upper bound.

According to certain aspects of the present disclosure, a common multiplier may be applied to all synaptic inputs of the neuron circuit to regulate the firing rate. In an aspect, adjusting the firing rate by the step amount may be achieved by adjusting the applied multiplier.

Figure 15A:
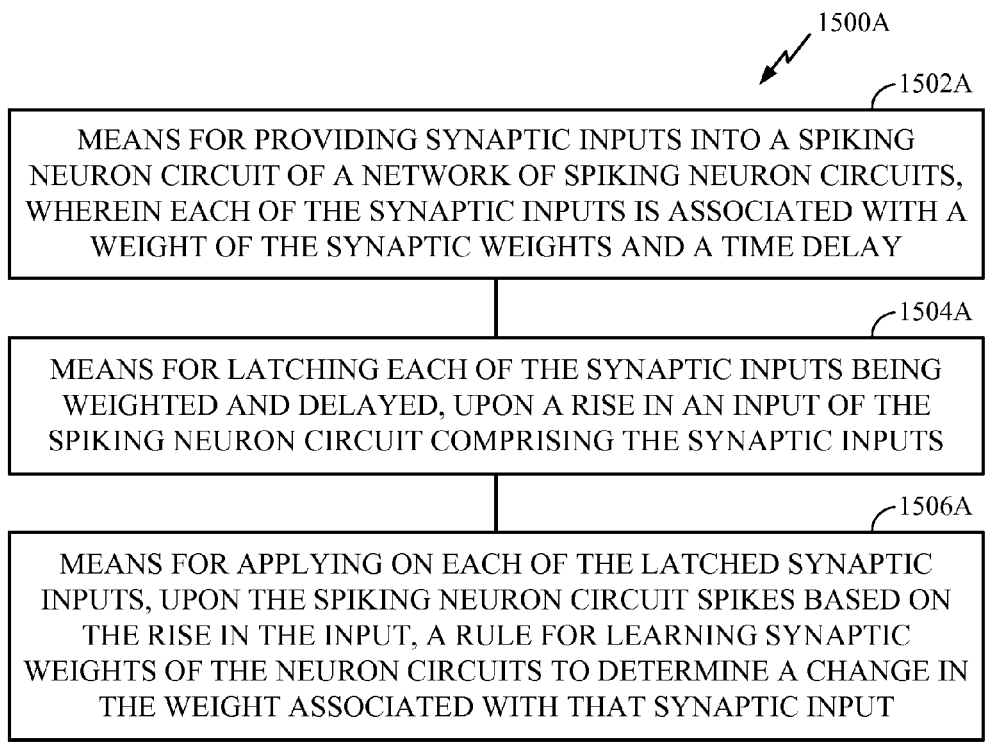
FIG. 15A illustrates example components capable of performing the operations illustrated in FIG. 15.
Figure 16A:
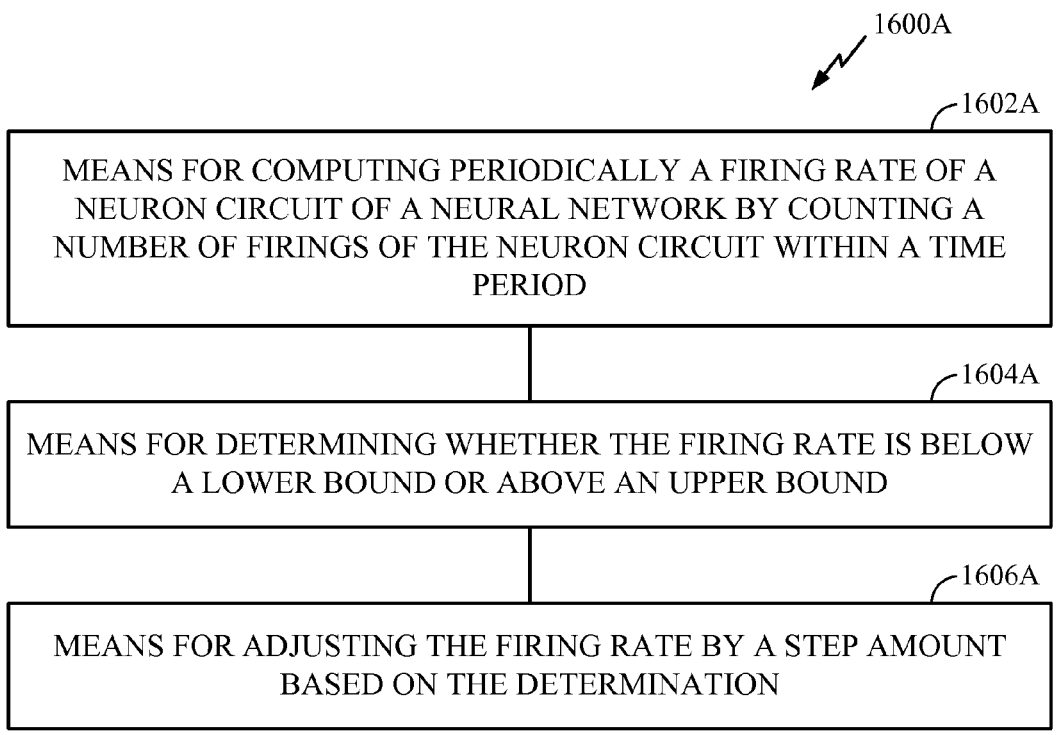
FIG. 16A illustrates example components capable of performing the operations illustrated in FIG. 16.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering. For example, operations 1500 and 1600 illustrated in FIG. 15 and FIG. 16 correspond to components 1500A and 1600A illustrated in FIG. 15A and FIG. 16A.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method of merging a network of spiking neuron circuits with a rule for learning synaptic weights associated with the neuron circuits, comprising:
    providing synaptic inputs into a neuron circuit of the network, wherein each of the synaptic inputs is associated with a synaptic weight and a time delay;
    latching each of the synaptic inputs being weighted and delayed, upon a rise in an input of the neuron circuit comprising the synaptic inputs; and
    upon the input or upon the neuron circuit spiking based on the rise in the input, applying the learning rule on the latched synaptic inputs to determine a change in the synaptic weight associated with that synaptic input.

2. The method of claim 1, wherein the learning rule comprises a real-valued Hebbian learning rule.

3. The method of claim 2, wherein the Hebbian learning rule comprises the Oja learning rule.

4. The method of claim 1, wherein the time delay is equal to one or more multiples of a time delay resolution.

5. The method of claim 1, wherein the input of neuron circuit comprises a sum of the synaptic inputs, wherein each of the summed synaptic inputs is associated with a synapse characterized by the synaptic weight and the time delay.

6. The method of claim 1, wherein latching comprises:
    latching the weighed and delayed synaptic inputs when the input of neuron circuit is at a largest value since the neuron circuit fired last time.

7. The method of claim 1, wherein latching comprises:
    latching the weighed and delayed synaptic inputs upon any increase in the input of neuron circuit.

8. The method of claim 1, wherein the applied learning rule polarizes the synaptic weight associated with that synaptic input.

9. The method of claim 1, wherein the neuron circuit and the synaptic inputs are associated with a dynamic spiking neuron model.

10. The method of claim 1, wherein the neuron circuit and the synaptic inputs are associated with a leaky-integrate-and-fire neuron model.

11. The method of claim 1, wherein the learning rule is associated with a shifted Spike-Timing-Dependent Plasticity (STDP) learning curve to compensate for a delay from a defined level of depolarization of the synaptic inputs to spiking of the neuron circuit.

12. The method of claim 1, further comprising:
    utilizing a difference in time between firing of the neuron circuit and firing of a reference neuron circuit of the network to temporally code an output of another neuron circuit of the network, wherein
    the temporally coded output comprises information about a confidence that a spiking pattern of the synaptic inputs matches a defined pattern, and
    outputs of the neuron circuit and the reference neuron circuit are fed into the other neuron circuit to generate the temporally coded output.

13. The method of claim 1, further comprising:
    providing an output of the neuron circuit into another neuron circuit of the network to generate an output of the other neuron circuit, wherein
    a firing rate of the output of other neuron circuit indicates a confidence that a spiking pattern of the synaptic inputs into the neuron circuit matches a defined pattern.

14. The method of claim 1, further comprising:
    selecting, using oscillation at an input of a reference neuron circuit of the network, one of the neuron circuits as a memory cell to memorize a spiking pattern fed into the network, wherein
    the selection is based on that neuron circuit responding to the spiking pattern closest to a trough of the oscillation among a set of the neuron circuits.

15. An electrical circuit for merging a network of spiking neuron circuits with a rule for learning synaptic weights associated with the neuron circuits, comprising:
    a first circuit configured to provide synaptic inputs into a neuron circuit of the network, wherein each of the synaptic inputs is associated with a synaptic weight and a time delay;
    a second circuit configured to latch each of the synaptic inputs being weighted and delayed, upon a rise in an input of the neuron circuit comprising the synaptic inputs; and a third circuit configured to apply, upon the input or upon the neuron circuit spiking based on the rise in the input, the learning rule on the latched synaptic inputs to determine a change in the synaptic weight associated with that synaptic input.

16. The electrical circuit of claim 15, wherein the learning rule comprises a real-valued Hebbian learning rule.

17. The electrical circuit of claim 16, wherein the Hebbian learning rule comprises the Oja learning rule.

18. The electrical circuit of claim 15, wherein the time delay is equal to one or more multiples of a time delay resolution.

19. The electrical circuit of claim 15, wherein the input of neuron circuit comprises a sum of the synaptic inputs, wherein each of the summed synaptic inputs is associated with a synapse characterized by the synaptic weight and the time delay.

20. The electrical circuit of claim 15, wherein the second circuit is also configured to latch the weighed and delayed synaptic inputs when the input of neuron circuit is at a largest value since the neuron circuit fired last time.

21. The electrical circuit of claim 15, wherein the second circuit is also configured to latch the weighed and delayed synaptic inputs upon any increase in the input of neuron circuit.

22. The electrical circuit of claim 15, wherein the applied learning rule polarizes the synaptic weight associated with that synaptic input.

23. The electrical circuit of claim 15, wherein the neuron circuit and the synaptic inputs are associated with a dynamic spiking neuron model.

24. The electrical circuit of claim 15, wherein the neuron circuit and the synaptic inputs are associated with a leaky-integrate-and-fire neuron model.

25. The electrical circuit of claim 15, wherein the learning rule is associated with a shifted Spike-Timing-Dependent Plasticity (STDP) learning curve to compensate for a delay from a defined level of depolarization of the synaptic inputs to spiking of the neuron circuit.

26. The electrical circuit of claim 15, further comprising:
a fourth circuit configured to utilize a difference in time between firing of the neuron circuit and firing of a reference neuron circuit of the network to temporally code an output of another neuron circuit of the network, wherein
the temporally coded output comprises information about a confidence that a spiking pattern of the synaptic inputs matches a defined pattern, and
outputs of the neuron circuit and the reference neuron circuit are fed into the other neuron circuit to generate the temporally coded output.

27. The electrical circuit of claim 15, further comprising:
a fourth circuit configured to provide an output of the neuron circuit into another neuron circuit of the network to generate an output of the other neuron circuit, wherein
a firing rate of the output of other neuron circuit indicates a confidence that a spiking pattern of the synaptic inputs into the neuron circuit matches a defined pattern.

28. The electrical circuit of claim 15, further comprising:
a fourth circuit configured to select, using oscillation at an input of a reference neuron circuit of the network, one of the neuron circuits as a memory cell to memorize a spiking pattern fed into the network, wherein
the selection is based on that neuron circuit responding to the spiking pattern closest to a trough of the oscillation among a set of the neuron circuits.

29. An apparatus for merging a network of spiking neuron circuits with a rule for learning synaptic weights associated with the neuron circuits, comprising:
means for providing synaptic inputs into a neuron circuit of the network, wherein each of the synaptic inputs is associated with a synaptic weight and a time delay;
means for latching each of the synaptic inputs being weighted and delayed, upon a rise in an input of the neuron circuit comprising the synaptic inputs; and
means for applying, upon the input or upon the neuron circuit spiking based on the rise in the input, the learning rule on the latched synaptic inputs to determine a change in the synaptic weight associated with that synaptic input.

30. The apparatus of claim 29, wherein the learning rule comprises a real-valued Hebbian learning rule.

31. The apparatus of claim 30, wherein the Hebbian learning rule comprises the Oja learning rule.

32. The apparatus of claim 29, wherein the time delay is equal to one or more multiples of a time delay resolution.

33. The apparatus of claim 29, wherein the input of neuron circuit comprises a sum of the synaptic inputs, wherein each of the summed synaptic inputs is associated with a synapse characterized by the synaptic weight and the time delay.

34. The apparatus of claim 29, further comprising:
means for latching the weighed and delayed synaptic inputs when the input of neuron circuit is at a largest value since the neuron circuit fired last time.

35. The apparatus of claim 29, further comprising:
means for latching the weighed and delayed synaptic inputs upon any increase in the input of neuron circuit.

36. The apparatus of claim 29, wherein the applied learning rule polarizes the synaptic weight associated with that synaptic input.

37. The apparatus of claim 29, wherein the neuron circuit and the synaptic inputs are associated with a dynamic spiking neuron model.

38. The apparatus of claim 29, wherein the neuron circuit and the synaptic inputs are associated with a leaky-integrate-and-fire neuron model.

39. The apparatus of claim 29, wherein the learning rule is associated with a shifted Spike-Timing-Dependent Plasticity (STDP) learning curve to compensate for a delay from a defined level of depolarization of the synaptic inputs to spiking of the neuron circuit.

40. The apparatus of claim 29, further comprising:
means for utilizing a difference in time between firing of the neuron circuit and firing of a reference neuron circuit of the network to temporally code an output of another neuron circuit of the network, wherein
the temporally coded output comprises information about a confidence that a spiking pattern of the synaptic inputs matches a defined pattern, and
outputs of the neuron circuit and the reference neuron circuit are fed into the other neuron circuit to generate the temporally coded output.

41. The apparatus of claim 29, further comprising:
means for providing an output of the neuron circuit into another neuron circuit of the network to generate an output of the other neuron circuit, wherein
a firing rate of the output of other neuron circuit indicates a confidence that a spiking pattern of the synaptic inputs into the neuron circuit matches a defined pattern.

42. The apparatus of claim 29, further comprising:
means for selecting, using oscillation at an input of a reference neuron circuit of the network, one of the neuron circuits as a memory cell to memorize a spiking pattern fed into the network, wherein the selection is based on that neuron circuit responding to the spiking pattern closest to a trough of the oscillation among a set of the neuron circuits.

43. A computer program product for merging a network of spiking neuron circuits with a rule for learning synaptic weights associated with the neuron circuits, comprising a non-transitory computer-readable medium comprising code for:

providing synaptic inputs into a neuron circuit of the network, wherein each of the synaptic inputs is associated with a synaptic weight and a time delay;

latching each of the synaptic inputs being weighted and delayed, upon a rise in an input of the neuron circuit comprising the synaptic inputs; and upon the input or upon the neuron circuit spiking based on the rise in the input, applying the learning rule on the latched synaptic inputs to determine a change in the synaptic weight associated with that synaptic input.

44. The computer program product of claim 43, wherein the learning rule comprises a real-valued Hebbian learning rule.

45. The computer program product of claim 44, wherein the Hebbian learning rule comprises the Oja learning rule.

46. The computer program product of claim 43, wherein the time delay is equal to one or more multiples of a time delay resolution.

47. The computer program product of claim 43, wherein the input of neuron circuit comprises a sum of the synaptic inputs, wherein each of the summed synaptic inputs is associated with a synapse characterized by the synaptic weight and the time delay.

48. The computer program product of claim 43, wherein the computer-readable medium further comprises code for:

latching the weighed and delayed synaptic inputs when the input of neuron circuit is at a largest value since the neuron circuit fired last time.

49. The computer program product of claim 43, wherein the computer-readable medium further comprises code for:

latching the weighed and delayed synaptic inputs upon any increase in the input of neuron circuit.

50. The computer program product of claim 43, wherein the applied learning rule polarizes the synaptic weight associated with that synaptic input.

51. The computer program product of claim 43, wherein the neuron circuit and the synaptic inputs are associated with a dynamic spiking neuron model.

52. The computer program product of claim 43, wherein the neuron circuit and the synaptic inputs are associated with a leaky-integrate-and-fire neuron model.

53. The computer program product of claim 43, wherein the learning rule is associated with a shifted Spike-Timing-Dependent Plasticity (STDP) learning curve to compensate for a delay from a defined level of depolarization of the synaptic inputs to spiking of the neuron circuit.

54. The computer program product of claim 43, wherein the computer-readable medium further comprises code for:

utilizing a difference in time between firing of the neuron circuit and firing of a reference neuron circuit of the network to temporally code an output of another neuron circuit of the network, wherein the temporally coded output comprises information about a confidence that a spiking pattern of the synaptic inputs matches a defined pattern, and outputs of the neuron circuit and the reference neuron circuit are fed into the other neuron circuit to generate the temporally coded output.

55. The computer program product of claim 43, wherein the computer-readable medium further comprises code for:

providing an output of the neuron circuit into another neuron circuit of the network to generate an output of the other neuron circuit, wherein a firing rate of the output of other neuron circuit indicates a confidence that a spiking pattern of the synaptic inputs into the neuron circuit matches a defined pattern.

56. The computer program product of claim 43, wherein the computer-readable medium further comprises code for:

selecting, using oscillation at an input of a reference neuron circuit of the network, one of the neuron circuits as a memory cell to memorize a spiking pattern fed into the network, wherein the selection is based on that neuron circuit responding to the spiking pattern closest to a trough of the oscillation among a set of the neuron circuits.

* * * * *